US012754943B2

(12) United States Patent
Soares dos Santos et al.

(10) Patent No.: US 12,754,943 B2
(45) Date of Patent: Oct. 6, 2026

(54) FACILITATING LARGE SCALE SUMMARIZATION, LABELLING, AND CATEGORIZATION USING LARGE LANGUAGE MODELS

(71) Applicant: Dell Products, L.P., Round Rock, TX (US)

(72) Inventors: Jéssica Soares dos Santos, Rio de Janeiro (BR); David Burth Kurka, Campinas (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/022,624

(22) Filed: Jan. 15, 2025

(65) Prior Publication Data

US 2026/0203333 A1 Jul. 16, 2026

(51) Int. Cl.
*G06F 16/338* (2019.01)
*G06F 16/28* (2019.01)
(Continued)

(52) U.S. Cl.
CPC .......... *G06F 16/338* (2019.01); *G06F 16/282* (2019.01); *G06F 16/345* (2019.01); *G06F 16/355* (2019.01)

(58) Field of Classification Search
CPC .... G06F 16/338; G06F 16/282; G06F 16/345; G06F 16/355
See application file for complete search history.

(56) References Cited

U.S. PATENT DOCUMENTS 10,963,262 B2 * 3/2021 Kadowaki ................. G06F 8/70
2024/0403428 A1 * 12/2024 Lal ...................... H04L 63/1441

OTHER PUBLICATIONS

Ma, et al. "InsightPilot: An LLM-Empowered Automated Data Exploration System." Proceedings of the 2023 Conference on Empirical Methods in Natural Language Processing: System Demonstrations. 2023.

(Continued)

*Primary Examiner* — Ajay M Bhatia
*Assistant Examiner* — Berhanu Mitiku
(74) *Attorney, Agent, or Firm* — Amin, Turocy & Watson, LLP

(57) ABSTRACT

Facilitating large scale summarization, labelling, and categorization using large language models is provided. A method includes transforming, by a system comprising at least one processor, a group of source data into a hierarchical structure representation. The transforming includes performing an iterative process of repeated calls to a sorting pipeline. Further, performing of the iterative process includes facilitating respective content summations for respective source data items of the group of source data, resulting in individual content summations. Performing of the iterative process also includes facilitating grouping of individual content summations into respective groups and facilitating respective categorizations of the respective groups, resulting in generated collections determined based on the respective categorizations. Additionally, performing of the iterative process includes facilitating summarization of the generated collections, resulting in a summarized collection. The method also includes rendering, by the system via a user device, the summarized collection as the hierarchical structure representation.

20 Claims, 21 Drawing Sheets

(51) Int. Cl.
*G06F 16/34* (2025.01)
*G06F 16/355* (2025.01)

(56) References Cited

OTHER PUBLICATIONS

Gunn, Michael, et al. "Creating a Fine Grained Entity Type Taxonomy Using LLMs." arXiv preprint arXiv:2402.12557 (2024).
Sarthi et al. "Raptor: Recursive abstractive processing for tree-organized retrieval." arXiv preprint arXiv:2401.18059 (2024).
Su, et al. Caire-Covid: A Question Answering and Query-Focused Multi-Document Summarization System for COVID-19 Scholarly Information Management. arXiv:2005.03975, arXiv, Dec. 8, 2020. arXiv.org, https://doi.org/10.48550/arXiv.2005.03975.
El-Kassas, et al. "Automatic text summarization: A comprehensive survey." Expert systems with applications 165 (2021): 113679.
Chandrasekaran, et al. (2021). Evolution of semantic similarity—a survey. ACM Computing Surveys (CSUR), 54 (2), 1-37.
Li, et al. "A survey on text classification: From traditional to deep learning." ACM Transactions on Intelligent Systems and Technology (TIST) 13.2 (2022): 1-41.
Cozzolino, et al. "Document clustering." Wiley Interdisciplinary Reviews: Computational Statistics 14.6 (2022): e1588.

* cited by examiner

FACILITATING LARGE SCALE SUMMARIZATION, LABELLING, AND CATEGORIZATION USING LARGE LANGUAGE MODELS

BACKGROUND

Large Language Models (LLMs) are artificial intelligence models designed to comprehend and generate human like text. The most recent LLMs are based on the Transformers architecture, and such LLMs are known for their efficiency in handling long-term dependencies in text. Dealing with large collections of documents is a regular task in enterprise environments. For example, several folders with many files may need to be managed and organized and the task of keeping these folders organized in the long term may be very challenging. If performed manually, this is a tedious and laborious process, that requires reading all documents, sorting the documents, creating categories, labelling, and summarizing the document. The use of LLMs to help with the management and organization of these files has been used in conjunction with manual interaction, but such use has not been sufficient to control the large collection of documents.

The above-described context with respect to large language models is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes transforming, by a system comprising at least one processor, a group of source data into a hierarchical structure representation. The transforming includes performing an iterative process of repeated calls to a sorting pipeline. Further, performing of the iterative process includes facilitating respective content summations for respective source data items of the group of source data, resulting in individual content summations. Performing of the iterative process also includes facilitating grouping of the individual content summations into respective groups and facilitating respective categorizations of the respective groups, resulting in generated collections determined based on the respective categorizations. Additionally, performing of the iterative process includes facilitating summarization of the generated collections, resulting in a summarized collection. The method also includes rendering, by the system via a user device, the summarized collection as the hierarchical structure representation.

In an implementation, the iterative process is a first iterative process, the summarized collection is intermediate output data, and the method further includes, prior to the rendering, performing a second iterative process of repeated calls to the sorting pipeline for the summarized collection as the intermediate output data, resulting in an updated summarized collection. The method also includes rendering, by the system via the user device, the updated summarized collection as the hierarchical structure representation.

According to some implementations, the method includes, prior to the facilitating of the summarization of the generated collections, determining, by the system, respective quantities of children nodes associated with the generated collections. The method also includes, based on a collection of the generated collections being determined to comprise a quantity of children nodes that is greater than a defined threshold, dividing the collection into subcollections. In an example, the dividing includes using a title of the collection as an input context.

In an example, facilitating of the summarization of the generated collections can include determining a textual summary of all elements contained in the generated collections.

In accordance with some implementations, the method includes using, by the system, a large language model for the facilitating of the respective content summations. The method also includes sending, by the system, a prompt to the large language model. The prompt can include formatted joining instructions and information indicative of content to be summarized.

The method can include, according to some implementations, prior to the facilitating of the respective content summations, dividing, by the system, the group of source data into batch sets. Respective sizes of the batch sets are determined based on a size of a context of a large language model. The method can also include generating, by the system, a first temporary summary for a first batch set of the batch sets. In an example, the generating of the first temporary summary can include sending a first prompt to the large language model. The first prompt can include a summarization instruction and a first list of contents contained in the first batch set. Further, the method can include generating, by the system, a second temporary summary for a second batch set of the batch sets. The generating of the second temporary summary can include sending a second prompt to the large language model. The second prompt can include a combination of an update instruction. The method also includes replacing, by the system, the first temporary summary with the second temporary summary. The second temporary summary is an output of the large language model.

The hierarchical structure representation can be a tree structure according to some implementations. For example, the group of source data can be represented as leaves of the tree structure and a root of the tree structure can represent a collection of the generated collections.

In an example, the rendering can include outputting the summarized collection as a treemap view that comprises nested rectangles that represent the hierarchical structure representation. In another example, the rendering can include outputting the summarized collection as a tree view that displays the generated collections as a tree that is expandible or collapsible based on selection of elements of the tree. In yet another example, the rendering can include outputting the summarized collection as a file explorer view.

Another embodiment relates to a system that includes at least one processor and at least one memory that stores executable instructions that, when executed by the at least one processor, facilitate performance of operations. The operations can include generating content summaries for respective inputs of a group of received inputs and, based on the content summaries, grouping first inputs of the group of received inputs as a first group and second inputs of the group of received inputs as a second group. The operations can also include generating a summary that comprises first information indicative of the first category and second information indicative of the second category. Further, the operations can include outputting the summary as an interactive and configurable hierarchical structure representation to be rendered via another system other than the system.

According to an implementation, generating of the content summaries can be facilitated using a large language model. Further to this implementation, the operations can include sending a prompt to the large language model. The prompt can include formatted joining instructions and information indicative of respective content of the respective inputs.

In some implementations, the operations can include, prior to the generating the content summaries, dividing the group of received inputs into batches. Respective sizes of the batches are selected based on a context size of a large language model. The operations can also include generating a first temporary summary for a first batch of the batches. The generating of the first temporary summary can include sending a first prompt to the large language model. The first prompt can include a summarization instruction and a first data structure comprising first information indicative of first contents of the first batch. Further, the operations can include generating a second temporary summary for a second batch of the batches. The generating of the second temporary summary can include sending a second prompt to the large language model. The second prompt can include a combination of an update instruction, the first temporary summary, and a second data structure comprising second information indicative of second contents of the second batch. The operations can also include replacing the first temporary summary with the second temporary summary. The second temporary summary can be an output of the large language model.

In an example, the outputting can include outputting the hierarchical structure representation as a tree structure. Leaves of the tree structure can be indicative of inputs of the group of received inputs. A root of the tree structure can be indicative of the summary.

In another example, the outputting can include outputting the hierarchical structure representation as a treemap view that comprises nested rectangles that represent the hierarchical structure representation. In yet another example, the outputting can include outputting the summary as a tree view that displays the summary as a tree that is expandible or collapsible based on selection of elements of the tree. In still another example, the outputting can include outputting the summary as a file explorer view.

Yet another embodiment relates to a non-transitory machine-readable medium, comprising executable instructions that, when executed by at least one processor of network equipment, facilitate performance of operations. The operations can include transforming files into a hierarchical structure representation. The transforming can include performing an iterative process of repeated calls to a sorting pipeline. The iterative process can include summarizing respective content for the files, resulting in individual content summations, and grouping the individual content summations into respective groups. The iterative process can also include categorizing the respective groups, resulting in generated collections, and summarizing the generated collections, resulting in a summarized collection. The operations can include outputting the summarized collection as the hierarchical structure representation at a user device.

According to an implementation, the operations can include, prior to the summarizing of the generated collections, determining respective quantities of children nodes associated with the generated collections. The operations can also include determining that a collection of the generated collections comprises a quantity of children nodes greater than a defined threshold. Further, the operations can include, in response to determining that the collection comprises the quantity of children nodes greater than the defined threshold, dividing the collection into subcollections.

The operations can include, according to some implementations, employing a large language model for the summarizing of the respective content for the files. Further, the operations can include sending a prompt to the large language model. The prompt can include formatted joining instructions and information indicative of the respective content to be summarized.

In some implementations, the operations can include, prior to the summarizing of the respective content, splitting the files into batch sets. Respective sizes of the batch sets can be determined based on a size of a context of a large language model. The operations can also include generating a first temporary summary for a first batch set of the batch sets. The generating of the first temporary summary can include sending a first prompt to the large language model. The first prompt can include a summarization instruction and a first list of contents contained in the first batch set. Further, the operations can include generating a second temporary summary for a second batch set of the batch sets. The generating of the second temporary summary can include sending a second prompt to the large language model. The second prompt can include a combination of an update instruction, the first temporary summary, and a second list of contents contained in the second batch set. Additionally, the operations can include replacing the first temporary summary with the second temporary summary. The second temporary summary is an output of the large language model.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

As mentioned above, dealing with large collections of documents is a regular task in enterprise environments. While each team member has to manage several folders with many files, applications, such as conversational systems, rely on large document databases as underlying knowledge to better provide answers to assist their users. The task of keeping folders organized in the long term may be very challenging. If performed manually, this is a tedious and laborious process that requires reading all the documents, sorting the documents, creating categories, labelling, and summarizing the documents. This process is complex and extremely time consuming and might not even be able to be accomplished at all.

In this context, provided herein is a strategy to process and group documents and/or other source data in a large dataset such that the documents and/or other source data are organized automatically using Large Language Models (LLMs). Although LLMs have shown ability to perform these tasks independently for small texts, the problem of categorizing, grouping, and summarizing content for a large collection of files and texts is still open and is a problem being addressed with the disclosed embodiments.

The approach proposed herein is based on processing documents into a hierarchical structure of summaries. It is noted that although various embodiments will be discussed and illustrated with respect to documents, the various embodiments are not limited to documents. Instead, other input data or source data can be utilized. For example, the input data (source data) can include any uncategorized and/or categorized collection of documents. For example, the input data (source data) can include, but is not limited to, unexplored folders, file storages, documents, emails (e.g., email collections), text messages, chat messages, files, newsletters, news articles, news feeds, collection of published papers, advertisements, voicemails, voice recordings, movies, films, other written material, other audio material, and/or other visual material, and/or portions thereof. As it relates to previously categorized source data, the disclosed embodiments can be applied to further fine tune the categorization of such source data.

Figure 1A:
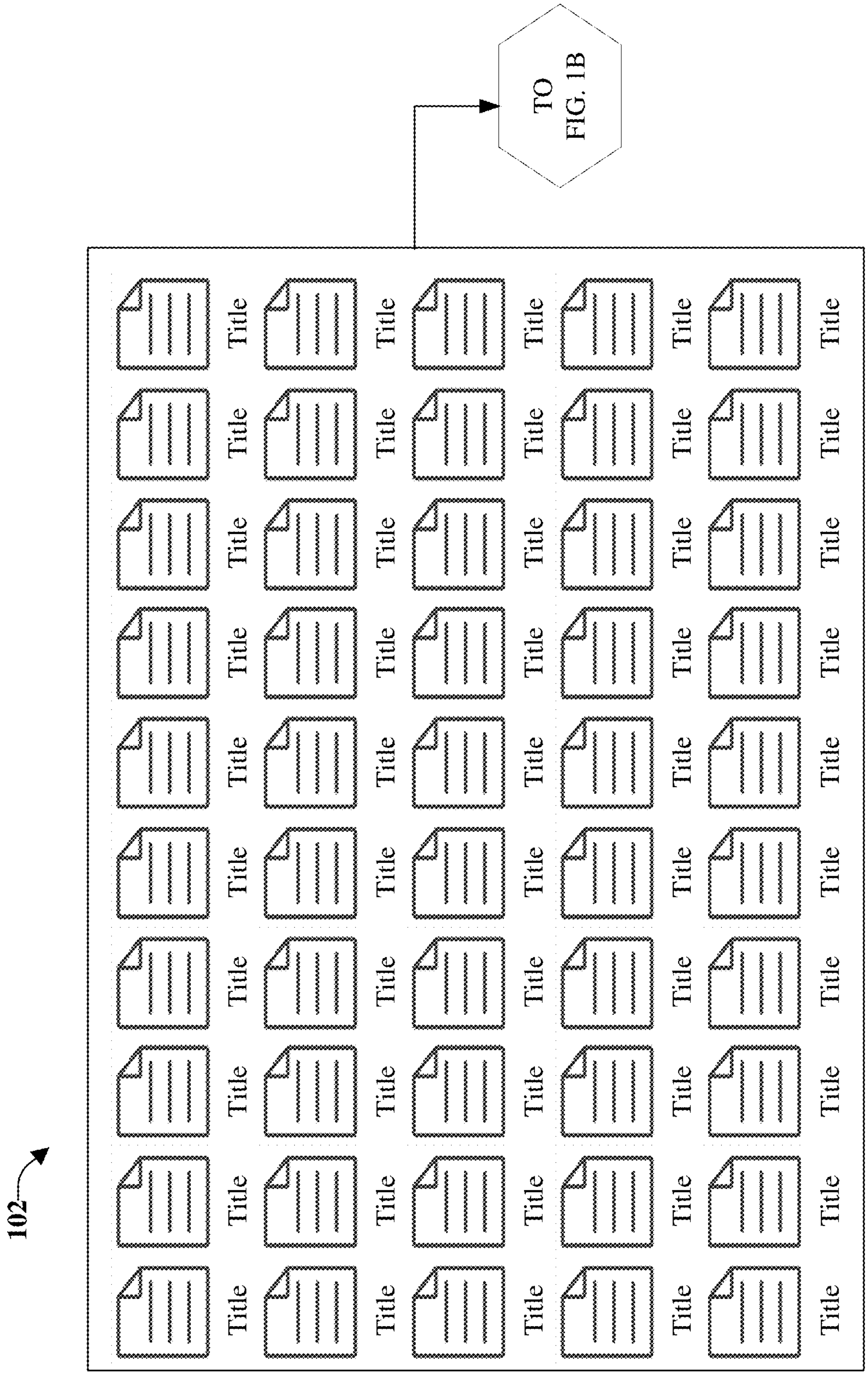
FIGS. 1A and 1B illustrate an example, non-limiting representation of a simplified view of the proposed solution in accordance with one or more embodiments described herein.
Figure 1B:
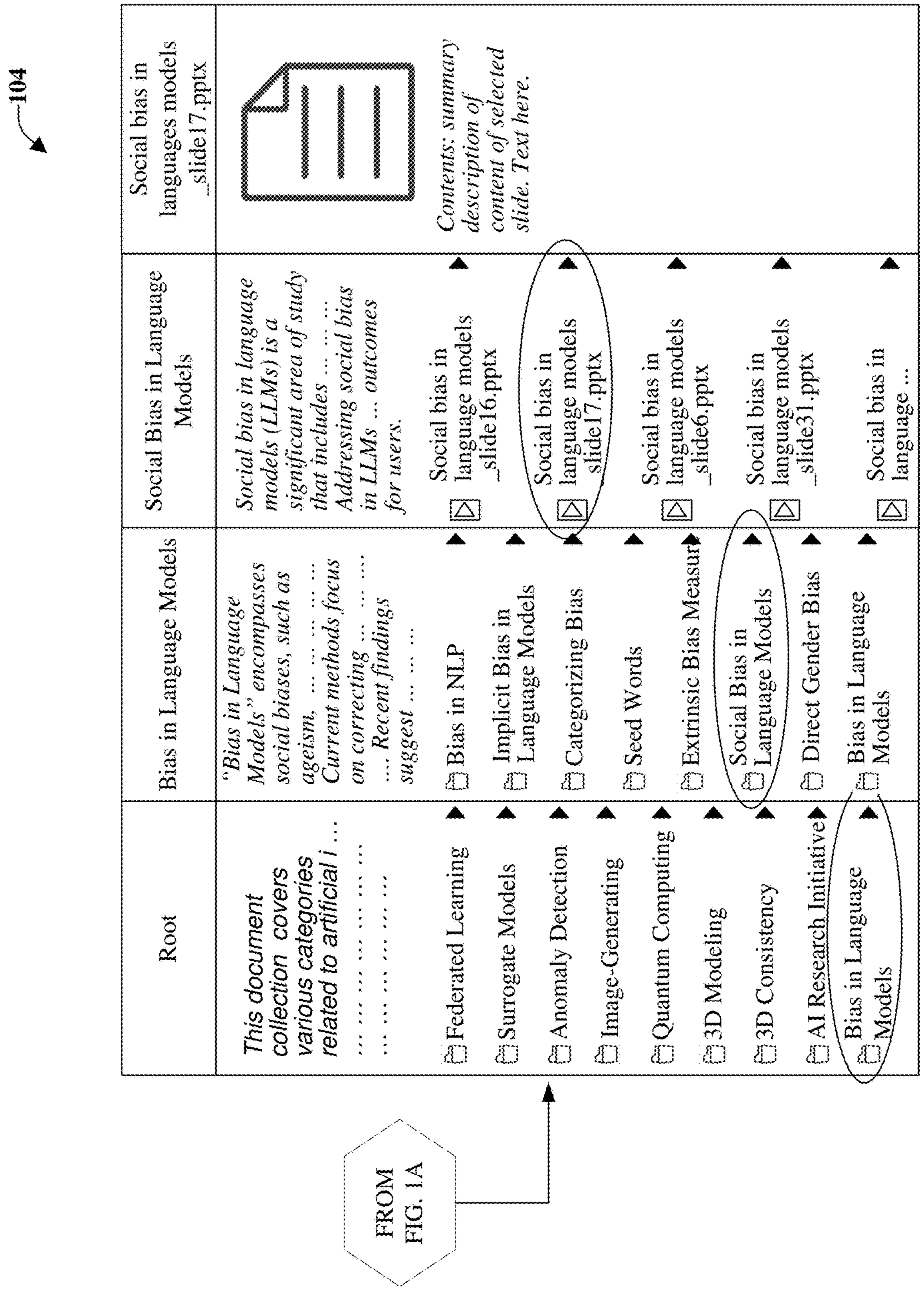

FIGS. 1A and 1B illustrate an example, non-limiting representation of a simplified view of the proposed solution in accordance with one or more embodiments described herein. FIG. 1A illustrates an example, non-limiting, display screen that includes representations of source data 102, also referred to as input data, which includes a large folder of uncategorized documents. As illustrated, there is a multitude of source data 102, which fills the entire display screen and might even include additional source data that does not fit on a single display screen.

According to some implementations, the source data comprises a single category (e.g., all are files, all are emails, and so on), as illustrated in FIG. 1A. However, in some implementations, the source data comprises two or more different categories. For example, the source data can include files and emails. In another example, the source data can include news articles and texts. In yet another example, the source data can include documents, texts, and emails.

Using the disclosed embodiments, the source data 102 of FIG. 1A is transformed into a summarized view 104 of output data as categorized documents, as illustrated in FIG. 1B. The summarized view 104 provides a more concise explanation of the source data. The summarized view 104 also allows navigation of parts of the collection in an interactive and progressive way so that categories are gradually expanded. Various ways of displaying the summarized view 104 can be utilized and are customizable. In some embodiments, the summarized view 104 is represented as a tree or as hierarchical summaries. Examples of visualizations that can be adopted with the tree generated with the disclosed embodiments include, for example, a treemap view, a tree view, a file explorer view, and so on, as will be discussed in further detail below The embodiments provided herein allow interactive and partial navigation of results and can be executed locally. The embodiments are scalable to large datasets and can be applied for cases in which the data collection does not fit into a LLM context window (e.g., consumes more tokens than the maximum tokens allowed in the LLM input/prompt).

The creation of easy and digestible representations of large collections through hierarchical summaries (as illustrated in FIG. 1B) can be used in internal applications such as email digests, file explorers, and/or other tools used to inform while saving considerable amounts of time, due to its organization capabilities.

A list of practical problems solved by the disclosed embodiments include the following: (i) Organization of large collections of documents in categories based on summaries that can be used to improve information retrieval pipelines as search applications or the ones applied to select relevant data to feed Retrieval Augmented Generation (RAG) based LLMs (e.g., Dell Chat). (ii) The various embodiments can assist users to explore unknown collections of documents before interacting with conversational question answering systems, such as, for example, Dell Chat. (iii) The embodiments disclosed herein can help users to organize personal folders with many documents, which can assist with the identification of unrelated documents that were placed in the wrong folder.

Figure 2:
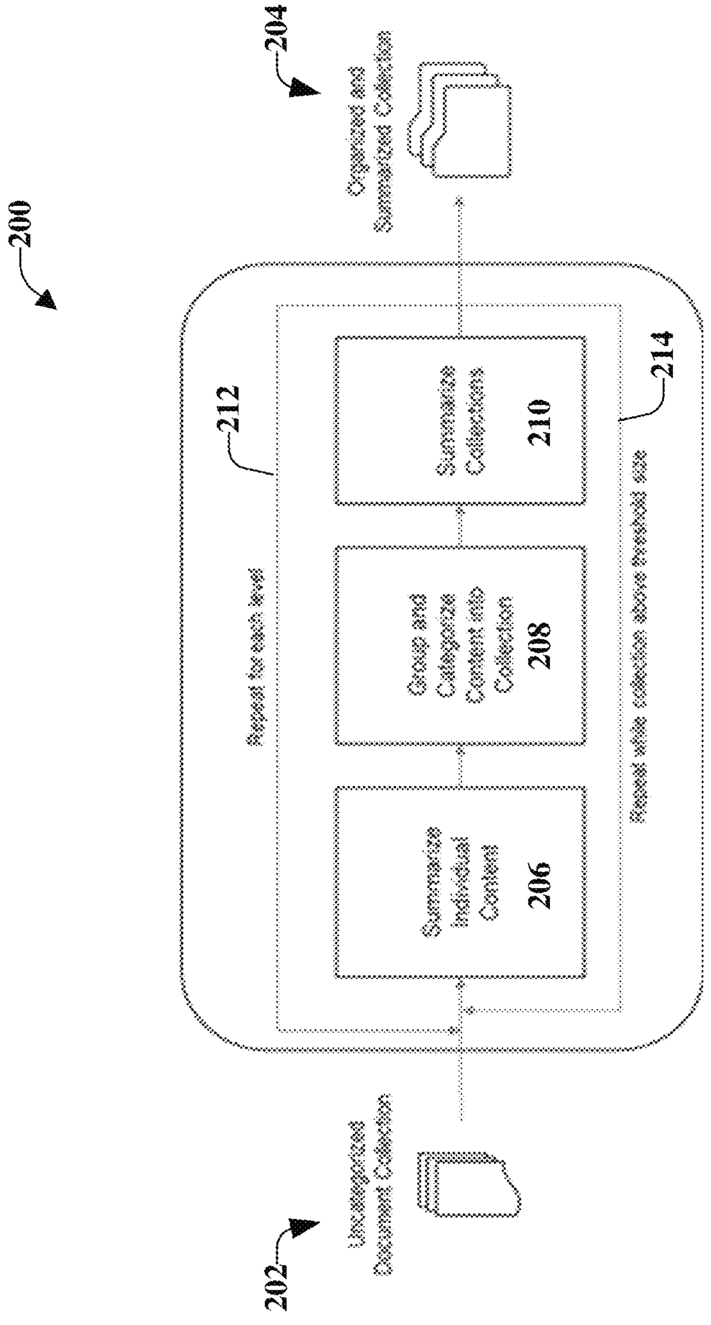
FIG. 2 illustrates an example, non-limiting, system that facilitates large scale summarization, labelling, and categorization using large language models in accordance with one or more embodiments described herein.

FIG. 2 illustrates an example, non-limiting, system 200 that facilitates large scale summarization, labelling, and categorization using large language models in accordance with one or more embodiments described herein. Repetitive description of like elements employed in other embodiments described herein is omitted for sake of brevity. The system 200 can comprise one or more of the components and/or functionality of the computing devices, the systems, and/or the computer-implemented methods discussed herein, and vice versa.

Given a list of documents, such as the uncategorized document collection 202 (e.g., the source data 102 of FIG. 1A), the system 200 generates a collection tree 204, which is an organized and summarized view of the collection, represented by a hierarchical structure of a tree (e.g., the summarized view 104 of FIG. 1B). In the hierarchical structure of the tree terminal nodes (e.g., leaves) are the documents being organized, containing for each element a title and a textual content. Intermediate nodes represent collections, and point to children nodes, containing the collection components. Each collection also contains a title and a summary of the content of all its children.

The collection tree is generated following an iterative process of repeated calls for a sorting pipeline. The sorting pipeline can include at least three steps, which are individual content summarization 206, content grouping and categorization 208, and collection summarization 210. These steps in the sorting pipeline can be performed for multiple documents so that large datasets can be processed without issues.

The sorting pipeline runs iteratively so to create a multilevel structure (e.g., the collection tree 204). There are two separate flows that run in two separate loops. These two flow (or two feedback loops) are a bottom-up flow 212 and a top-down flow 214.

For the bottom-up flow 212, starting from a collection (e.g., the uncategorized document collection 202), perform the sorting pipeline, so to create an upper level, that is, disjoint collections containing the starting list of content as children. Repeat this loop until the stopping criterion is reached (e.g., when two successive levels have the same result or when the iteration counter reaches a predetermined number of times).

For the top-down flow 214, for every collection created in the bottom-up step (e.g., the bottom-up flow 212) that has more children than a predefined threshold, perform a division of their children using the sorting pipeline, so to create an intermediate level between the collection and its original children. Repeat this process recursively until newly created collections contain less children than the threshold.

The embodiments provided herein provide various advantages, such as, for example, a strategy to process a large collection of source inputs that go beyond what can fit inside a LLM context window. Another advantage is the automation of grouping, categorization and summarization tasks using LLM in scalable ways. Yet another advantage is iterative processes for summarization and categorization using LLMs. Document (or other source input) presentation (e.g., rendering or outputting in a perceivable format) based on multi-level summaries to allow progressive discovery in a navigable way, is another advantage. Further, another advantage is a structured and customizable procedure that can be executed locally to organize large collections of documents.

It is noted that conventional approaches take advantage of LLMs to help on tasks related to exploratory analysis, however, there are no approaches that completely delegate this task to LLMs (prior to the disclosed embodiments). For example, one conventional approach uses external tools to generate insights from a dataset and uses LLMs to select proper insights according to user questions. Alternatively, another conventional approach uses LLMs to organize a list of terms in a taxonomy that is reorganized and expanded according to user interactions. Still another conventional approach proposes a similar hierarchical structure, but without scalability guarantees for classification (e.g., all embeddings need to fit in memory for classification work) and for multi-document summarization (e.g., all texts need to be summarized to fit within a single LLM prompt context). Also, this conventional approach does not explore the Natural Language Understanding (NLU) ability of LLMs to label and group documents. Yet another conventional approach explores the general concept of multi-document summarization to improve question answering tasks, but without any of the techniques provided with the disclosed embodiments.

In further detail, LLMs are artificial intelligence models designed to comprehend and generate human like text. The most recent LLMs are based on the Transformers architecture, which are known for their efficiency in handling long-term dependencies in text.

An LLM prompt contains the text that will be sent to the model. In addition to the question on question answering tasks, the LLM prompt can include instructions that guide the model to generate the response. For example, the user (or other entity) can ask the model to render the output in a specific format or give some examples of expected responses. As utilized herein, an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as a user, an entity, or entities depending on the context.

LLMs text input are limited by a prompt context window, which is the span of text that the LLM can receive at one time and is taken into account when generating answers to questions or when making predictions. The size of the text sent as input to the LLM is measured in tokens, where each token can be a set of words or parts of words. If the text exceeds the context window size, the text may be truncated, which can sometimes lead to less accurate or incomplete answers.

The various embodiments provided herein use LLMs to help with data categorization, data labeling, and data summarization. The disclosed embodiments also adopt some techniques to deal with the prompt size limitation of LLMs, keeping categories history, and partial summaries.

As it relates to data summarization, summarizing texts from long documents is a task that requires a lot of effort and time, if performed manually (if it can be performed at all). Recent advances in Natural Language Processing (NLP) and in particular the development of more advanced LLMs, enable the automation of the summarization task. Automatic approaches for this task can be divided in two types, namely, extractive approaches and abstractive approaches. Extractive approaches extract sentences directly from the original text to create a summary. Abstractive approaches generate new sentences that convey the main ideas of the original text in a concise form to create a summary.

The embodiments provided herein focus on abstractive text summarization. Using LLMs trained for following user instructions for text manipulation. Therefore, the disclosed embodiments use LLMs with different prompts to generate summaries for given inputs.

Document categorization refers to the action of grouping a set of documents based on a given or defined criteria. The documents can be grouped by different criteria such as their content, title, general category, author, and so on. The categorization can be performed using different methods that include, for example, extracting text keywords, applying classification models trained on a predefined set of categories, using topic modeling or clustering techniques that can be based on semantic similarity. In accordance with some embodiments, document categorization using LLMs trained on question answering tasks are provided.

The processes provided herein facilitate large scale summarization, labelling, and categorization using LLM to organize sets of elements recursively. The processes run multiple times according to a predefined number which corresponds to the tree height. The output of each iteration is a new level of a collection tree containing the elements of the previous level grouped by categories. The process ends when the stop criteria is reached.

With continuing reference to FIG. 2, for the bottom-up flow 212, (Step 1) for each level, consider as input (e.g., the source data 102, the uncategorized document collection 202) a set of documents (if it is the first level) or a set of collections returned in a previous step (in any other level). For the individual content summarization 206 (step 1.1), a single source summarizer is used to generate or create individual summaries for all elements in the current level, so to extract the main attributes that will be used in the categorization. For the content grouping and categorization 208 (step 1.2), using a source categorizer, group individual summaries in categories, create collections containing their corresponding elements, and define representative titles for each collection.

For the top-down flow 214 (step 1.3) check if any of the collections generated by the content grouping and categorization 208 (step 1.2) has more children than a predefined threshold. If so, recursively break down the collection in subcollections, using the same process described in the above paragraph (bottom-up flow 212) but taking as input only the elements of the collection being divided and using the collection's title as extra context for the grouping and categorization step.

During the collection summarization 210 of the sorting pipeline (step 1.4), for each collection created during the content grouping and categorization 208 for the bottom-up flow 212 (step 1.2) and the top-down flow 214 (step 1.3), a multiple source summarizer is utilized to create a concise textual summary of all the elements contained in the collection.

The individual content summarization 206, the content grouping and categorization 208 (bottom-up flow and top-down flow), and the collection summarization 210 (steps 1, 1.1, 1.2, 1.3, and 1.4) are repeated a maximum level number of times (e.g., a defined number of times), or until the size of the outcome of the result is equal or bigger than its input.

A single root node is generated, as a new collection containing as children all collections generated in the last execution of step 1 (steps 1, 1.1, 1.2, 1.3, and 1.4), containing a general summary (using collection summarization) for the entire database.

The result is a tree (e.g., the collection tree 204). In the tree, the root is a collection and each node with children is parent of a set of (sub-) collections or parent of a set of documents. Documents are leaves of the tree.

In further detail, two different strategies are used for summarization, one for summarizing a single document or source, and another to summarize a collection of multiple sources.

Figure 3:
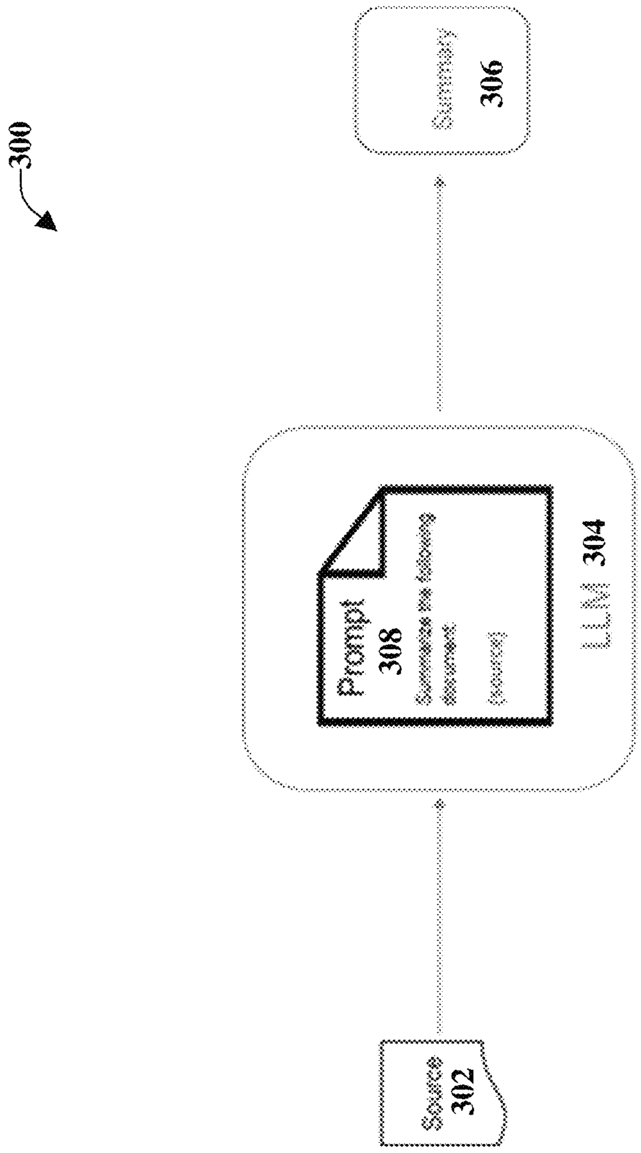
FIG. 3 illustrates an example, non-limiting, depiction of operations of a single source summarizer, in accordance with one or more embodiments described herein.

FIG. 3 illustrates an example, non-limiting, depiction of operations of a single source summarizer 300, in accordance with one or more embodiments described herein. Repetitive description of like elements employed in other embodiments described herein is omitted for sake of brevity.

As illustrated, source data 302 is received (e.g., the source data 102, the uncategorized document collection 202) at an LLM 304. The LLM 304 processes the source data 302 and generates an output, illustrated as a summary 306 (e.g., the summarized view 104, the collection tree 204).

Single document summarization is a straightforward task for LLMs, being achieved by prompt engineering. Thus, a prompt (e.g., prompt 308) is formatted with joining instructions and the content to be summarized and given to the LLM 304. The output of the LLM 304 is the summary 306. An example of a prompt that can be used for this task is:

"Summarize the following document:
{source}"

where {source} is replaced by the actual content of the source data 302.

Depending on the instruction, the summary 306 output by the LLM 304 can contain paraphrased content or higher-level features such as main topics or keywords.

This step is performed before the categorization process for each document and/or collection individually and can be performed in parallel for a set of multiple sources, since each summarization task is independent of the other summarization tasks.

Figure 4:
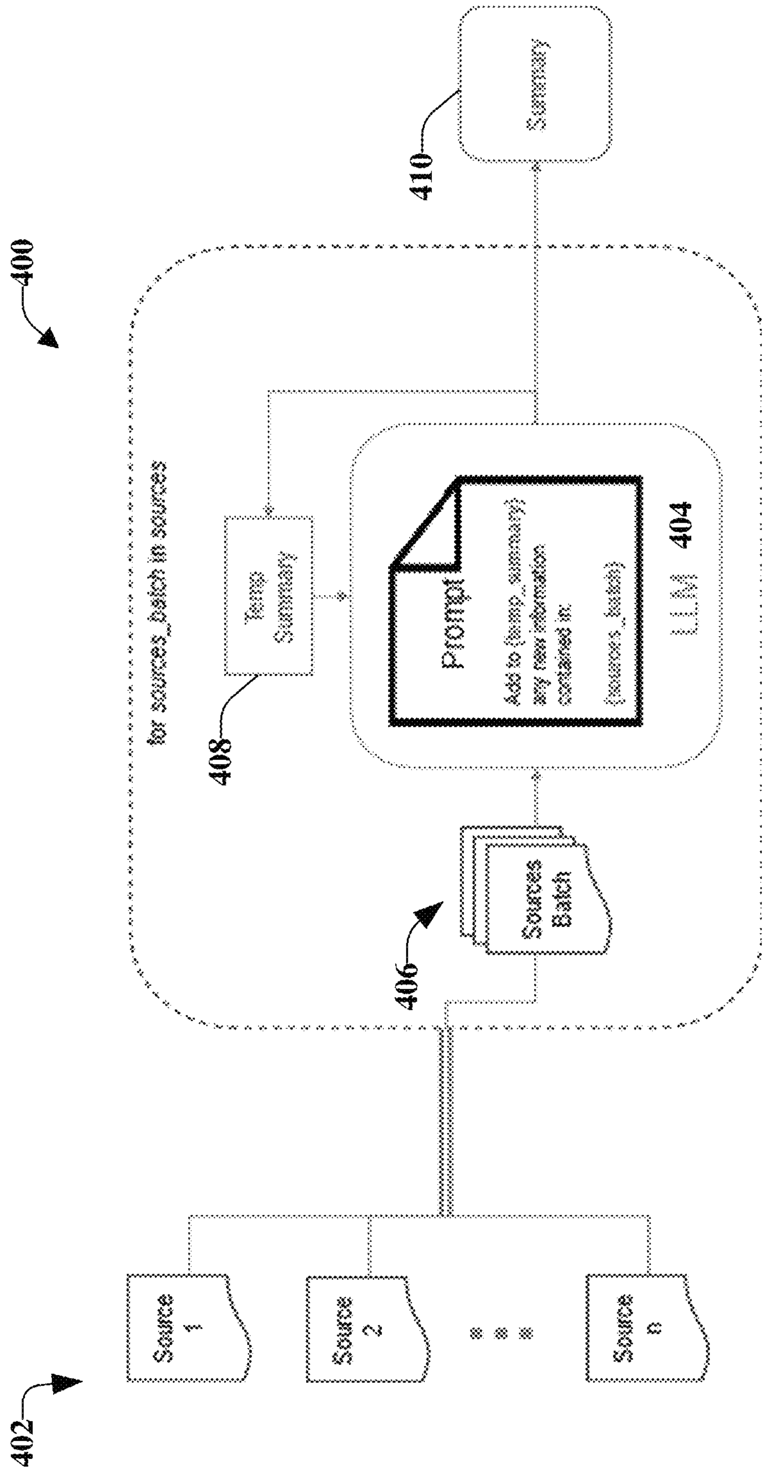
FIG. 4 illustrates an example, non-limiting, depiction of operations of a multiple source summarizer, in accordance with one or more embodiments described herein.

FIG. 4 illustrates an example, non-limiting, depiction of operations of a multiple source summarizer 400, in accordance with one or more embodiments described herein. Repetitive description of like elements employed in other embodiments described herein is omitted for sake of brevity.

When creating a single summary for multiple sources, alternative approaches should be used, since the amount of content to be summarized (the sum of all sources' contents) might surpass the context window of the LLM (prompt size). Therefore, the disclosed embodiments utilize an iterative strategy that can process arbitrarily large sets of sources.

The strategy is as follows. For a set of sources 402 to be summarized (e.g., the source data 102, the uncategorized document collection 202), split the set of sources into n sub-sets (batches) that fit into a context of an LLM 404. As illustrated, the set of sources 402 are split into first source data (source 1), second source data (source 2), through n source data (source n), where n is an integer.

For the first batch of a set of source batches 406, generate a temporary summary 408, presenting a prompt to the LLM 404 containing a general summarization instruction and the list of contents contained in the batch. For example:

"Summarize the following documents:
{source_1_content}
{source_2_content}
. . .
{source_n_content}
"

For the remaining batches of the set of source batches 406, create a prompt combining an update instruction, the temporary summary 408, and the contents of all documents in the batch. Feed the prompt to the LLM 404. The temporary summary 408 is replaced by the LLM output. Example of prompt:

"Update {temporary summary} with new information contained in the documents below:
{source_1_content}
{source_2_content}
. . .
{source_n_content}
"

Return the temporary summary as the final summary 410.

Figure 5:
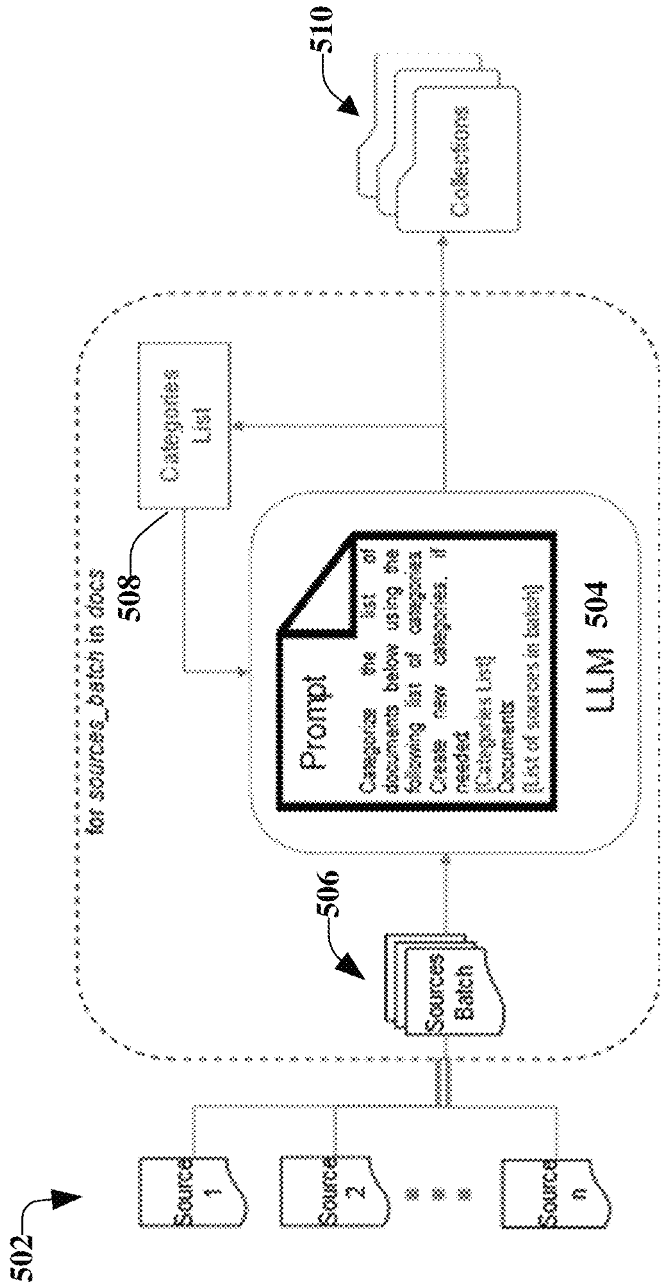
FIG. 5 illustrates an example, non-limiting, depiction of operations for sources categorization using large language models in accordance with one or more embodiments described herein.

FIG. 5 illustrates an example, non-limiting, depiction of operations for sources categorization using LLMs 500 in accordance with one or more embodiments described herein. Repetitive description of like elements employed in other embodiments described herein is omitted for sake of brevity.

The task of categorizing sources is also completely delegated to LLMs according to an embodiment. Due to the context window size limitation of LLMs, this type of categorization also requires that elements be categorized in batches. In order to optimize for space and performance, LLMs are asked to evaluate the document summary (generated with single source summarization) instead of the entire document.

The process operates as follows. For a set of sources 502 to be summarized (e.g., the source data 102, the uncategorized document collection 202), split the set of sources into n sub-sets (batches) that fit into a context of an LLM 504 (step 1). As illustrated, the set of sources 502 are split into first source data (source 1), second source data (source 2), through n source data (source n), where n is an integer.

Start with an empty category list which is extended in each batch iteration, if needed and an empty category mapping that will be updated to map category names to source names (step 2).

For each batch of a set of batches 506 (step 3), present a prompt to the LLM 504 including instructions for assigning categories to a list of documents and to consider the existing category list (step 3.1). If the element to be categorized is not related to any of the existing categories, the LLM 504 is instructed to create new categories. Example of prompt:

"Categorize the list of documents below using the following list of categories. Create new categories, if needed. Return a key-value mapping containing category names as keys and document titles as values.

List of existing categories: {category list}

DOCUMENTS

{source_1_title}: {source_1_content}
{source_2_title}: {source_2_content}
. . .
{source_n_title}: {source_n_content}
"

Use the output of the above noted prompt (step 3.1) to update category mapping and categories with new sources classifications and newly created categories in batch (step 3.2). As a postprocessing step (step 3.2.1): check for hallucinations, mislabeled or ill formatted items and list uncategorized sources in batch. Repeat categorization for uncategorized sources (identified in the postprocessing step (e.g., step 3.2.1)).

Optionally, erase category mapping, and repeat step 3 (for each batch in batches) with category list pre-populated (e.g., with the values obtained in the first run of step 3), to improve classification. Return category mapping.

In order to keep history between different batches, the LLM 504 is requested to provide the answer as a dictionary that contains the list of categories (categories list 508) and the corresponding elements (which are documents in the first level of the process or categories in upper levels) for each batch, as depicted in FIG. 5. An example of the list of categories passed to the LLM and the categories created by the LLM in each batch iteration is presented in Table 1 below:

TABLE 1

| Iteration | List of categories passed to the LLM | List of new categories |
|---|---|---|
| 1 | [ ] | ["Culinary," "Sports," "Education"] |
| 2 | ["Culinary," "Sports," "Education"] | ["Music"] |
| 3 | ["Culinary," "Sports," "Education," "Music"] | ["Politics"] |
| . . . | . . . | . . . |

Post processing steps are applied to discard: (i) hallucinations. The LLM can hallucinate and provide answers containing names of elements (documents or categories) that do not exist; and (ii) cases where the LLM output is not well formatted. LLM answers are discarded if such answers do not follow the expected output format. For both cases, the non-categorized elements are stored in a list to be reprocessed in next iterations.

Note that, since the complete process of creating collections produce titles and summaries for each collection, this method can be applied to categorize sets of collections or sets of documents.

Return collections 510 as the output to be rendered in a perceivable format.

Processing flows: Using the operations of summarization and categorization described above, an iterative routine is provided to process a whole (e.g., entire) document collection. Two distinct flows are executed alternately: bottom-up and top-down.

The bottom-up starts from the leaf elements (documents) and, from the leaf elements, create collections. After that, at each level it creates super collections from collections of the previous level. On the other hand, the top-down flow breaks large categories, according to a predefined threshold, into smaller categories.

Bottom-up Flow: An iterative process is provided to generate categories in multiple levels. For example, this process is useful for the exploratory analysis of datasets that contain many nested categories, as it allows the user to see a small set of categories at a time. In the bottom-up flow, each level is an abstraction of the previous one.

Figure 6:
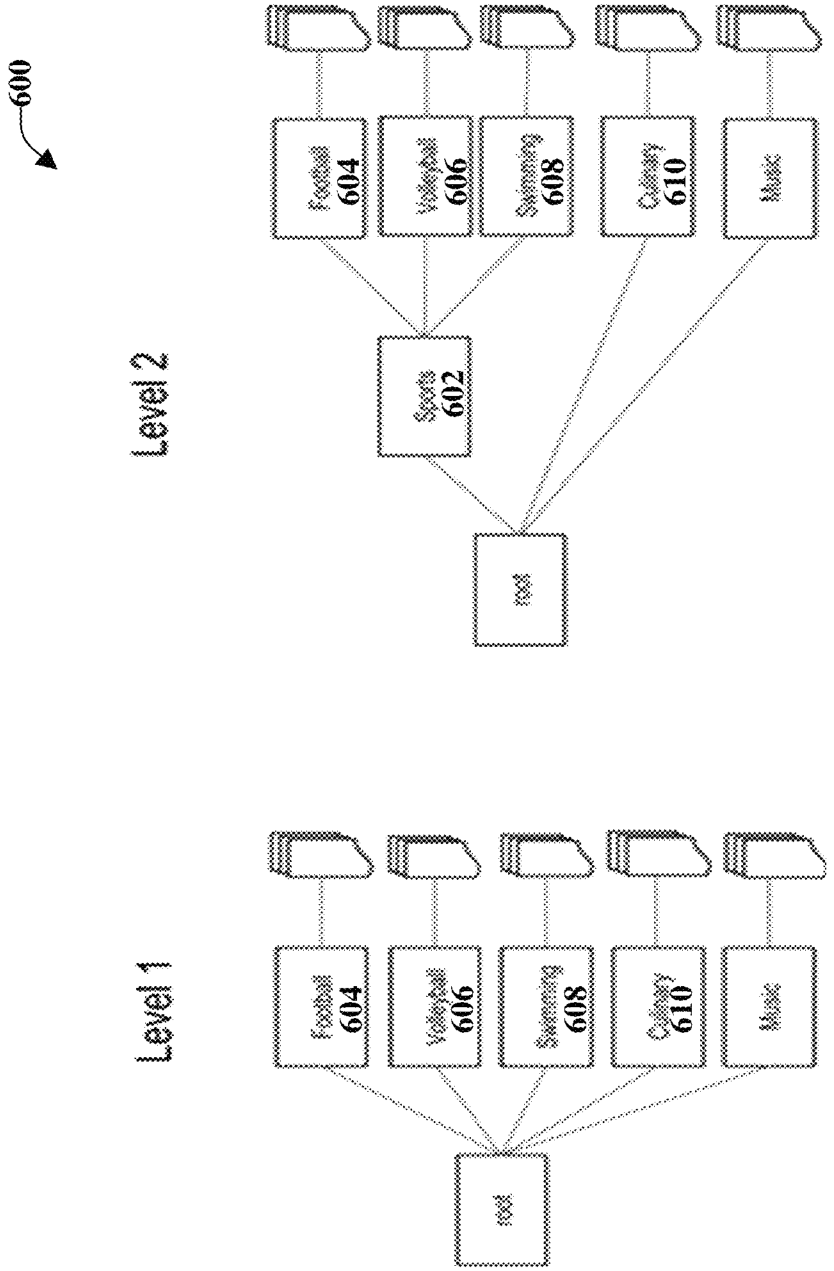
FIG. 6 illustrates an example, non-limiting, use case of a multi-level categorization of a bottom-up flow in accordance with one or more embodiments described herein.

FIG. 6 illustrates an example, non-limiting, use case of a multi-level categorization 600 of a bottom-up flow in accordance with one or more embodiments described herein. Repetitive description of like elements employed in other embodiments described herein is omitted for sake of brevity.

In the example of FIG. 6, there are two levels, namely, Level 1 and Level 2. The category Sports 602 is created at Level 2 to group Football 604, Volleyball 606, and Swimming 608 categories which, in turn, were created at Level 1, based on the theme of documents.

Figure 7:
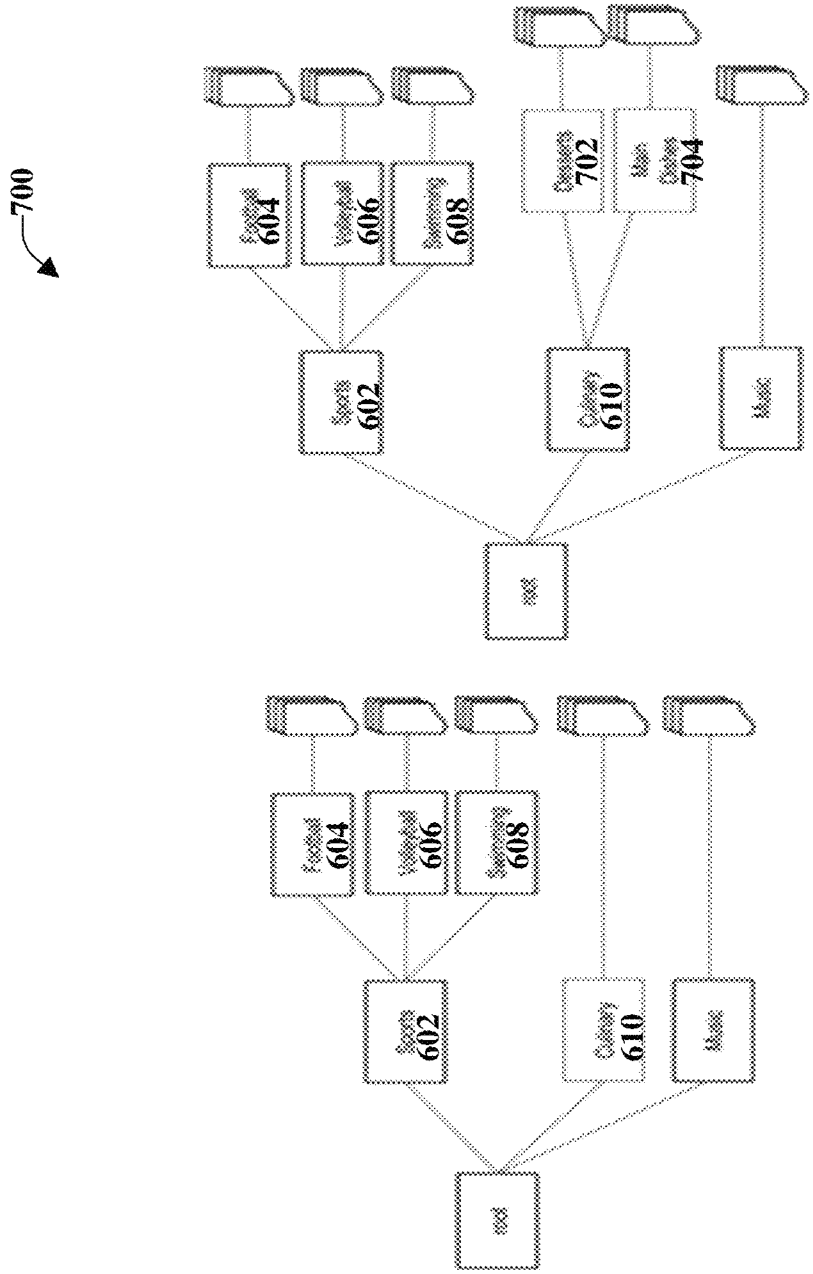
FIG. 7 illustrates an example, non-limiting, use case of a multi-level categorization of a top-down flow in accordance with one or more embodiments described herein.

FIG. 7 illustrates an example, non-limiting, use case of a multi-level categorization 700 of a top-down flow in accordance with one or more embodiments described herein. Repetitive description of like elements employed in other embodiments described herein is omitted for sake of brevity.

Top-Down Flow: The top-down flow is executed at the final of each level to break down categories that have many elements. In the example illustrated in FIG. 7, two new subcategories Desserts 702 and Main Dishes 704 are created from the Culinary 610 category. The LLM strategy uses a specific subcategorization prompt that receives as input the category that needs to be divided.

A stop criteria is included in the process. For the stop criteria, the iteration is terminated if the trees of two subsequent levels are equal or if a given number of iterations is achieved.

Given that the document collection is organized as a tree, the result can be rendered or provided to the user with different visualization strategies which allow navigation of parts of the collection in an interactive and progressive way so that categories are gradually expanded. Examples of visualization that are possible to be adopted with the tree generated with the disclosed embodiments include, for example, a treemap view, a tree view, a file explorer view, and so on.

Figure 8:
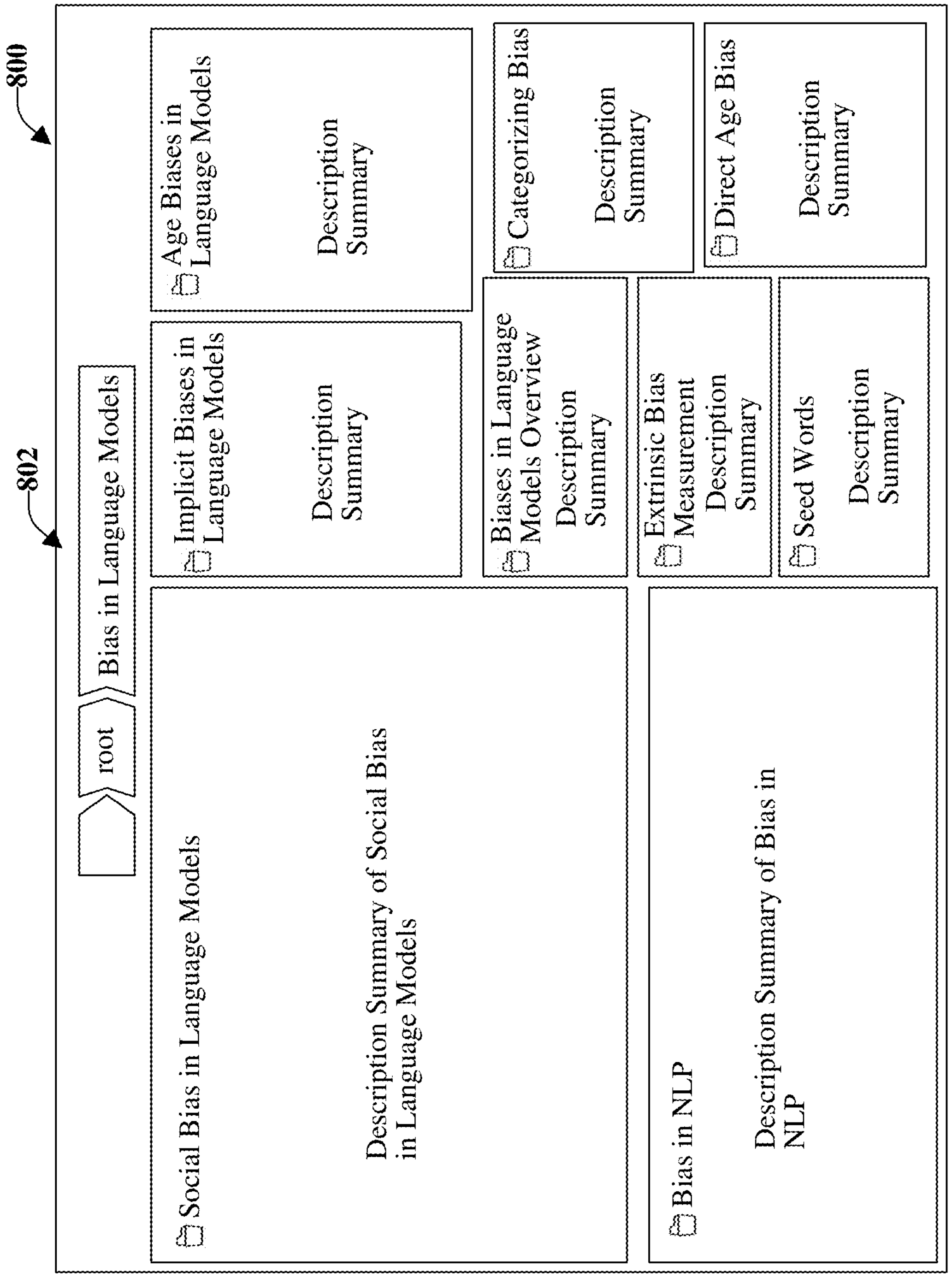
FIG. 8 illustrates an example, non-limiting, simplified representation of a treemap view in accordance with one or more embodiments described herein.

FIG. 8 illustrates an example, non-limiting, simplified representation of a treemap view 800 in accordance with one or more embodiments described herein. Repetitive description of like elements employed in other embodiments described herein is omitted for sake of brevity.

The treemap view 800 visual representation is based on nested rectangles. A main panel starts with only one rectangle that corresponds to the root node. When the user selects (e.g., clicks on) the root node (via an interface), the main panel exhibits the root node direct children which are collections (list of categories) that belong to the upper level of the tree. In this way, the user can select or click on a rectangle to zoom in on a specific part of the collection, seeing the sub-levels of the hierarchy. Each category is represented by a rectangle whose size is proportional to the number of child elements it has. A bar navigation 802 is placed above the main panel (or at another location) to allow the user to return to previous states in which the tree was less extended. Each rectangle contains a title and a description, wherein the description is a summary about the content contained within the rectangle. FIG. 8 presents an example of the tree generated by the disclosed embodiments displayed with the TreeMap visualization considering that the user followed the path: root>Bias in Language Models, as indicated by the bar navigation 802.

Figure 9:
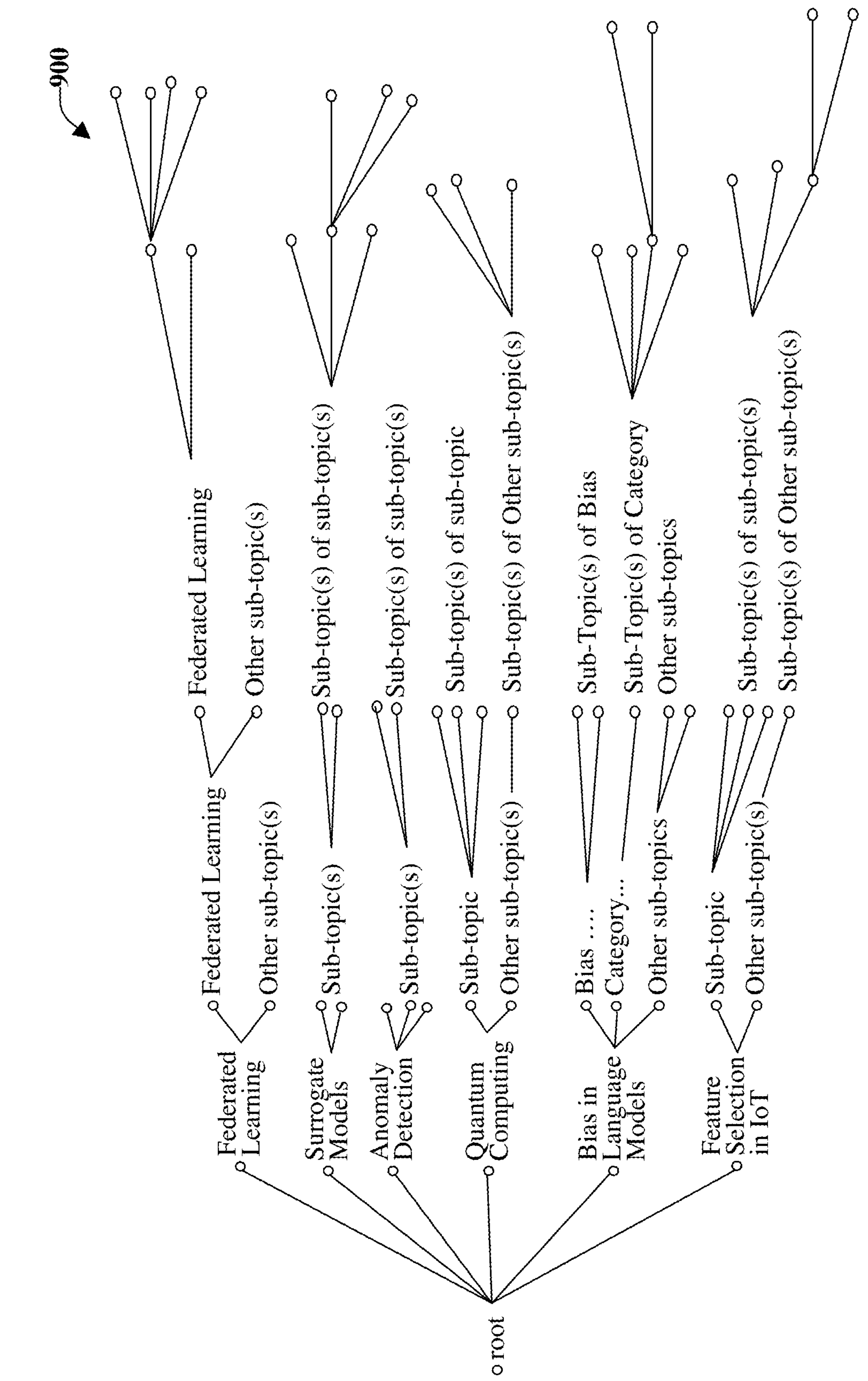
FIG. 9 illustrates an example, non-limiting, simplified representation of a tree view in accordance with one or more embodiments described herein.

FIG. 9 illustrates an example, non-limiting, simplified representation of a tree view 900 in accordance with one or more embodiments described herein. Repetitive description of like elements employed in other embodiments described herein is omitted for sake of brevity.

The tree view 900 visual representation is based on displaying the collection as a tree that can be expanded or collapsed, as is exhibited in FIG. 9. Each element can be presented as a circle with a title and a description which becomes visible when the user hovers the mouse over the circle and/or title. It starts with only one element that corresponds to the root node. When expanding a node, the child nodes are displayed. On the other hand, clicking on an expanded node will collapse it.

The file explorer view visual representation consists of using multiple panels that are expanded on click action, exhibiting the child elements in new panels appended to the right of the original panel. It starts with only one panel that contains the description of the collection followed by the list of categories that are direct children of the root node. The description of the clicked category appears at the top of its next panel. Examples of this visualization are presented in the next section with respect to FIGS. 10-13 below.

Experiments and Result. The proposed approach was applied to organize datasets in different use cases. A use case can include document folder exploration: organize a large collection of files by content in folders and subfolders. Another use case includes email sorting: organize a large collection of emails into categories. Still another use case includes a news feed digest: keep track of news and articles by creating summaries and clear organizational structure.

Figure 10:
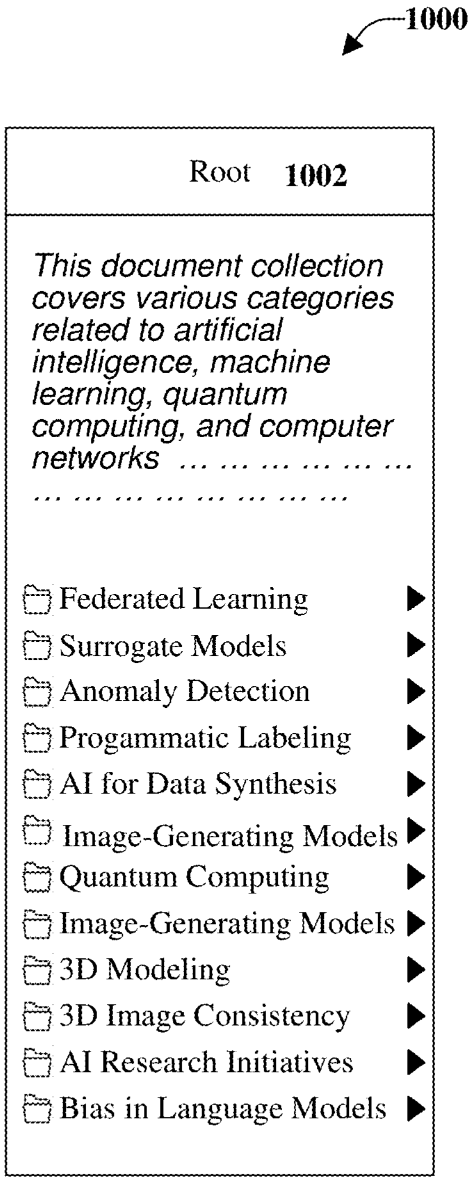
FIG. 10 illustrates an initial simplified graphical interface, in accordance with one or more embodiments described herein.

The following provides the results found when analyzing a large document folder (case 1) containing 500 documents, which included studies on different research topics. The following configuration was adopted in the experiment: A Mixtral 8x7B-Instruct as underlying LLM model, batches of 6 elements, Tree Height=3 (bottom-up flow), and Children threshold=10 (top-down flow). The File Explorer View was adopted to present the results. FIG. 10 illustrates an initial simplified graphical interface 1000, in accordance with one or more embodiments described herein. As illustrated, the initial graphical interface 1000 displays the collection summary followed by the set of categories at the last level of the tree (e.g., a root level 1002).

Figure 11:
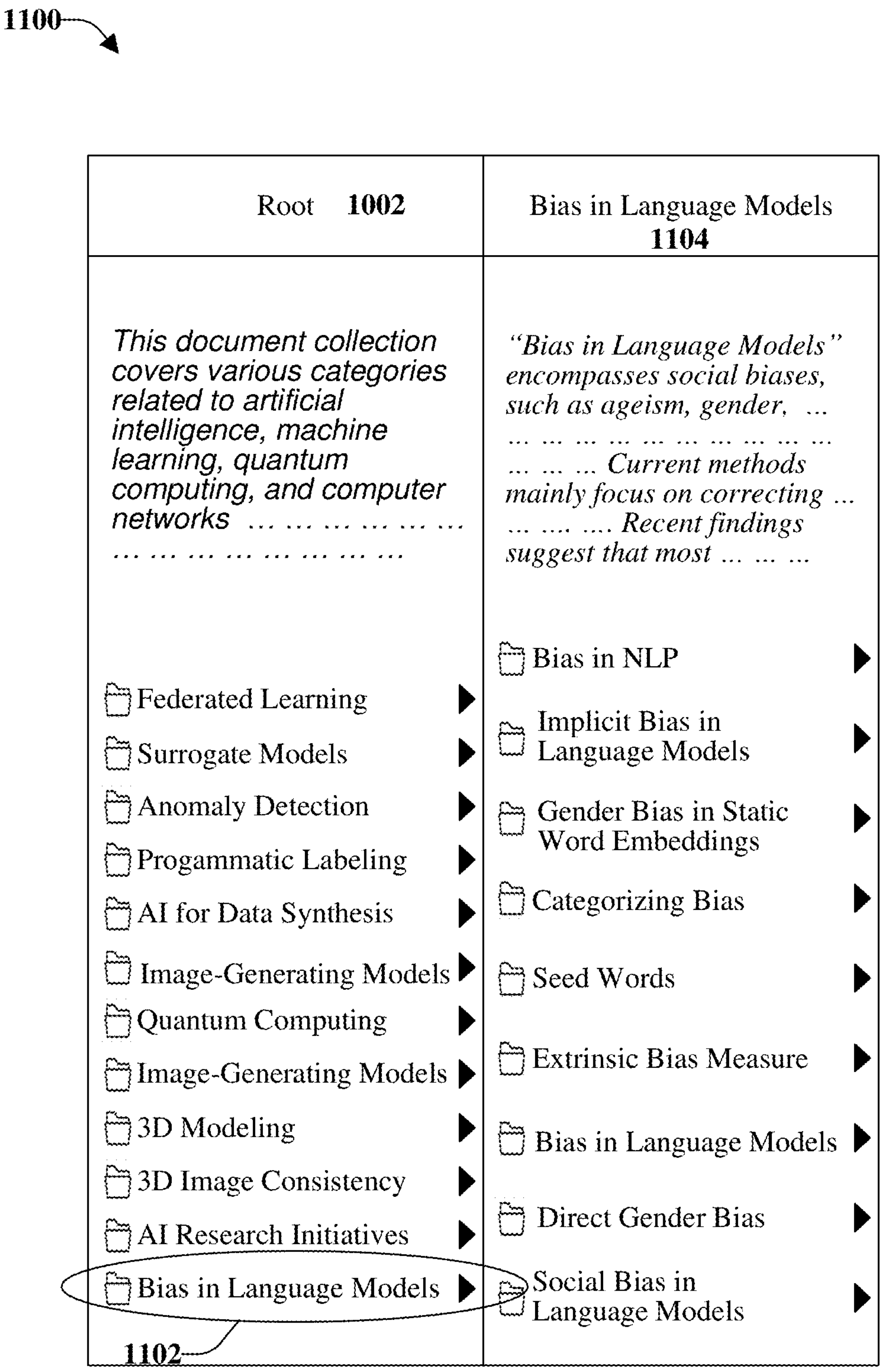
FIG. 11 illustrates a simplified view of the tree expansion after a first interaction, in accordance with one or more embodiments described herein.

FIG. 11 illustrates a simplified view of the tree expansion after a first interaction 1100, in accordance with one or more embodiments described herein. Specifically, FIG. 11 illustrates the tree expansion one level after the first interaction of the user. The element (indicated by the circle 1102 and entitled "Bias in Language Models") indicates that the user has selected this element to be expanded. The summary related to Bias in Language Models is then exhibited at the top of the second column 1104, followed by its subcategories, which include: Direct Gender Bias, Implicit Biases in Language Models, Extrinsic Bias Measurement, Social Bias, and so on.

Figure 12:
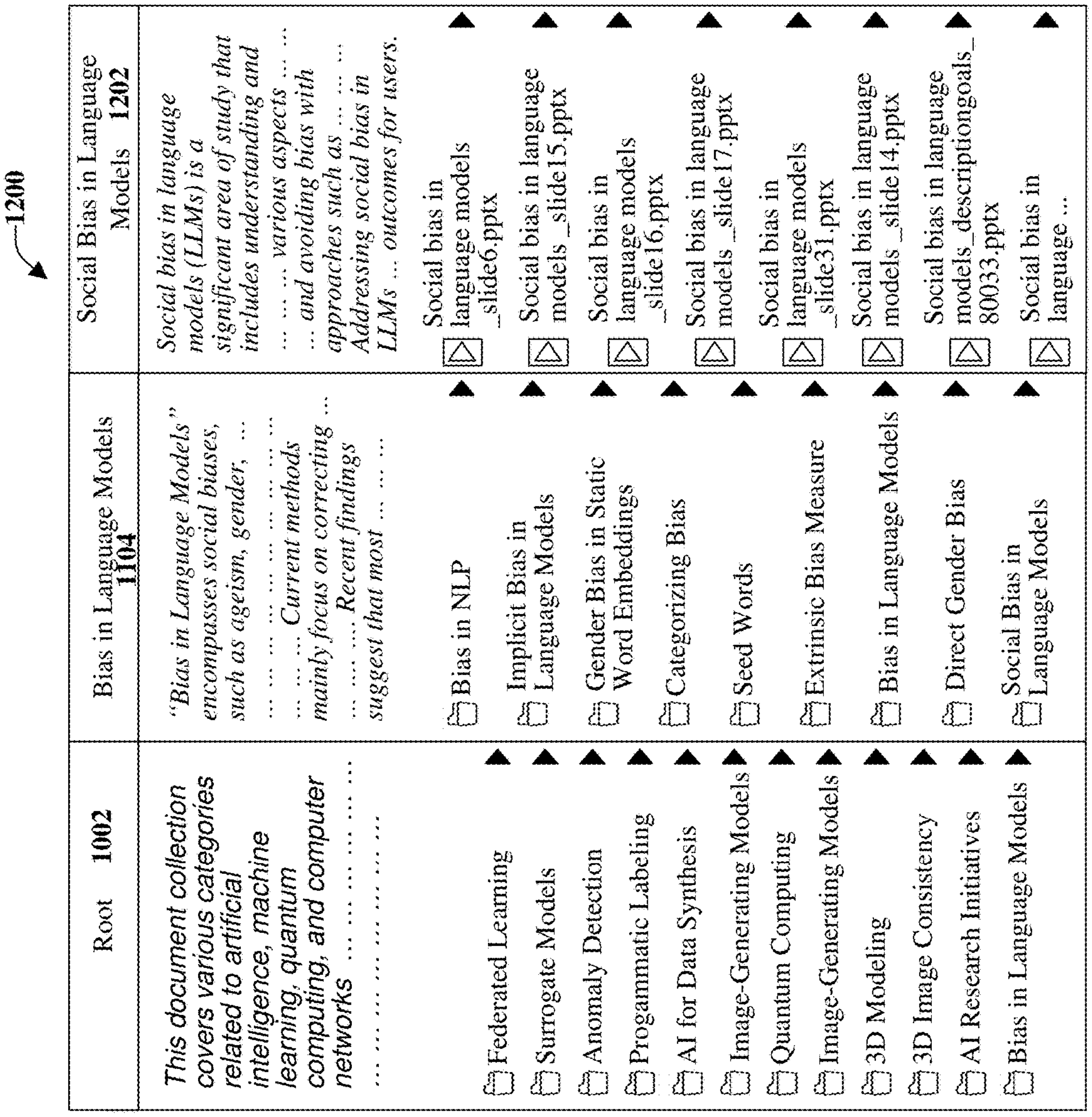
FIG. 12 illustrates a simplified view of the tree expansion after a second interaction, in accordance with one or more embodiments described herein.

FIG. 12 illustrates a simplified view of the tree expansion after a second interaction 1200, in accordance with one or more embodiments described herein. Specifically, FIG. 12 illustrates the tree expansion two levels after the user clicks on Social Bias in Language Models, in accordance with one or more embodiments described herein. In this point, the summary related to this category appears at the top of the third column 1202 followed by all the eight documents that were grouped within the category Social Bias in Language Models.

Figure 13:
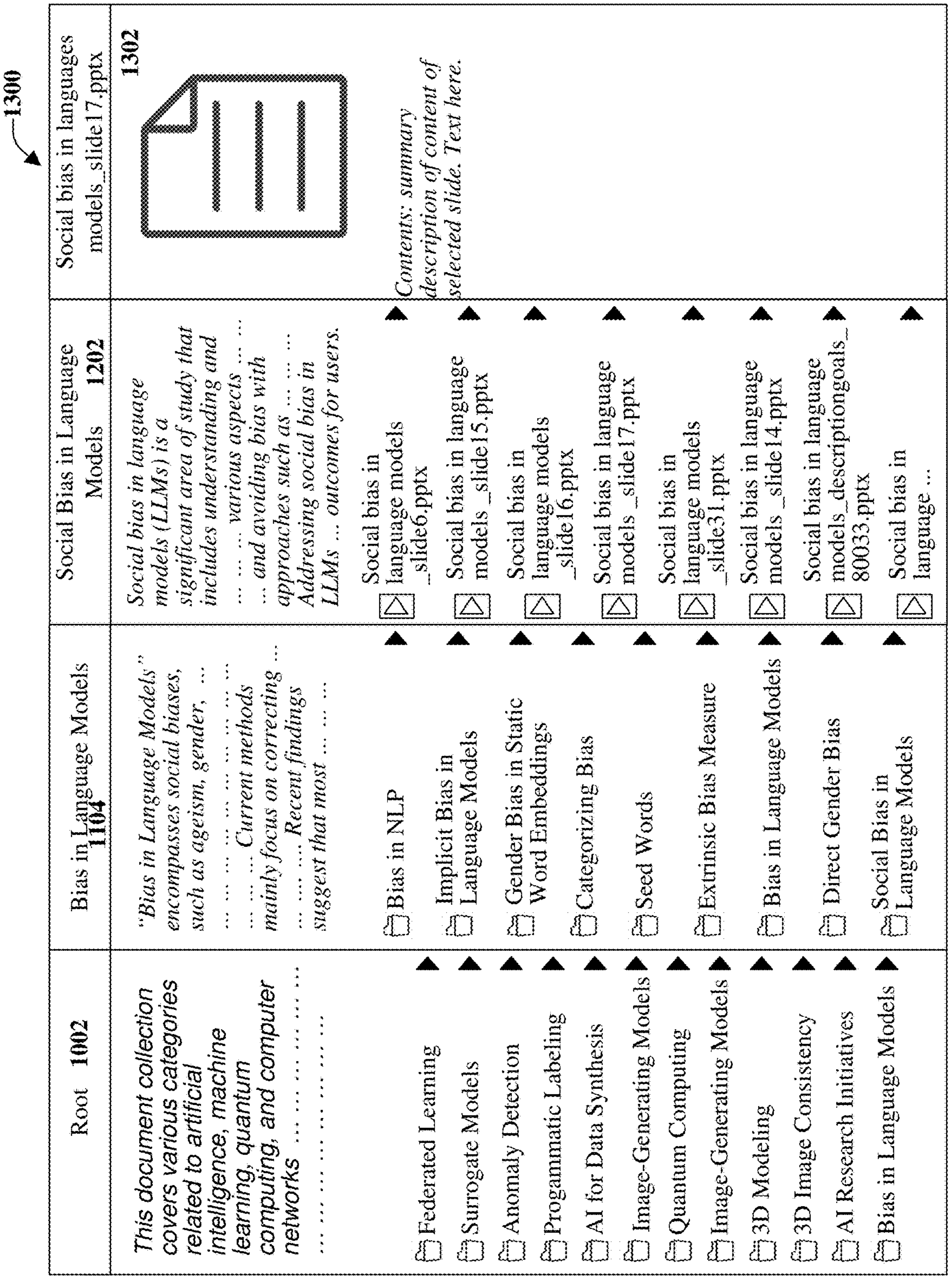
FIG. 13 illustrates a simplified view of the tree expansion after a third interaction, in accordance with one or more embodiments described herein.

Finally, FIG. 13 illustrates a simplified view of the tree expansion after a third interaction 1300, in accordance with one or more embodiments described herein. Specifically, FIG. 13 illustrates the tree expansion after selecting a specific document inside the category Social Bias in Language Models. The content of the selected document appears in the fourth column. In this example, the following navigation path was selected by the user: Root>Bias in Language Models>Social Bias in Language Models>"Social bias in languages models_slide17.pptx."

The disclosed embodiments can be utilized in various scenarios. For example, the proposed approach can assist the identification of the main topics of datasets, such as folders, emails, news feeds, that contain many documents that are not yet familiar to the user or the user did not have time to process. In corporate environments, this is a common issue, given that content is constantly generated by internal (e.g., Business Units (BUs), departments) and external (news outlets, competitors, academia), and the time to process all generated content is limited and finite. The insights gained from data exploration can be useful to direct inform the user, but can also be used as preliminary step in the building of derivative tools such as Retrieval Augmented Generation (RAG) LLM-based systems, such as Dell Chat, for example. Understanding the topics within the knowledge base can help in directing user queries more effectively to conversational systems. Another possibility is the detection of trends from news feeds. In this context, one can use the approach to create accessible digests and select relevant material to be placed on a reading list. Also, the generated summaries can enhance the understanding of the main topics being discussed.

The disclosed embodiments can be utilized for data organization. For example, organization of personal documents or corporative folders, and identification of unrelated documents to be removed in folders that have many documents that are supposed to be related to a specific topic. Another example is sorting emails by theme, considering large periods of time. Yet another example is dynamic creation of news digests from internet sources.

Further, the categories names and summaries provided by the various embodiments can be used to improve document search processes. In another example, the provided categories names and summaries can be used to select relevant information that should be put in the prompt of LLMs to answer user questions.

Figure 14:
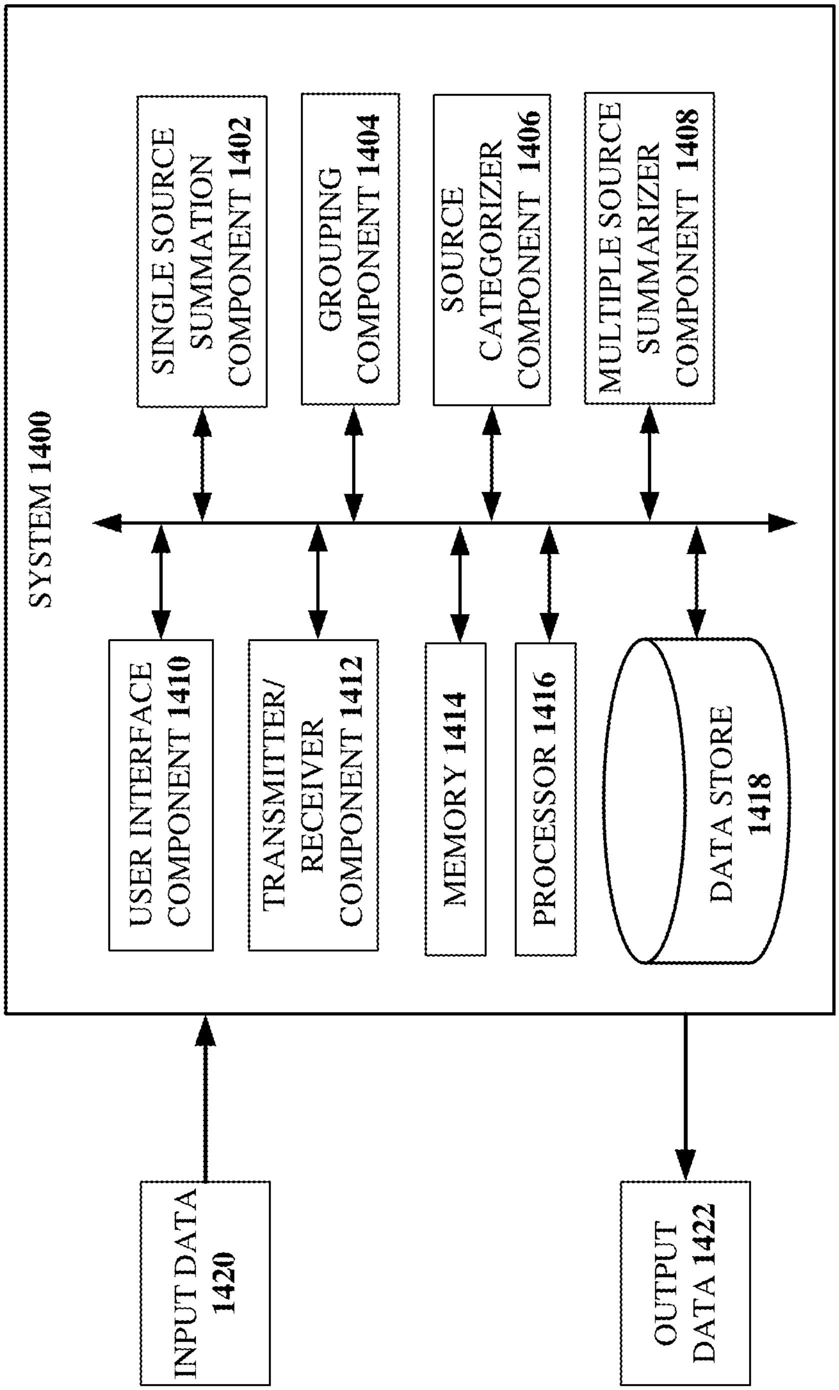
FIG. 14 illustrates an example, non-limiting, system for facilitating large scale summarization, labelling, and categorization using large language models in accordance with one or more embodiments described herein.

FIG. 14 illustrates an example, non-limiting, system 1400 for facilitating large scale summarization, labelling, and categorization using large language models in accordance with one or more embodiments described herein. Repetitive description of like elements employed in other embodiments described herein is omitted for sake of brevity. The system 1400 can comprise one or more of the components and/or functionality of the computing devices of and/or the computer-implemented methods discussed herein, and vice versa.

Aspects of systems (e.g., the system 1400 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 1400 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 1400 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, the system 1400 can include a single source summation component 1402, a grouping component 1404, a source categorizer component 1406, a multiple source summarizer component 1408, a user interface component 1410, a transmitter/receiver component 1412, at least one memory 1414, at least one processor 1416, and at least one data store 1418. The at least one memory 1414 can store computer executable components and instructions. The at least one processor 1416 can facilitate execution of the instructions (e.g., computer executable components and corresponding instructions) by the single source summation component 1402, the grouping component 1404, the source categorizer component 1406, the multiple source summarizer component 1408, the user interface component 1410, the transmitter/receiver component 1412, and/or other system components.

As depicted, in some embodiments, one or more of the single source summation component 1402, the grouping component 1404, the source categorizer component 1406, the multiple source summarizer component 1408, the user interface component 1410, the transmitter/receiver component 1412, the at least one memory 1414, the at least one processor 1416, and the at least one data store 1418 can be electrically, communicatively, and/or operatively coupled to one another to perform one or more functions of the system 1400.

The system 1400 receives, for each level (e.g., each iteration) and/or while the collection is above a defined threshold size, input data 1420 (e.g., via the user interface component 1410, via the transmitter/receiver component 1412). The input data 1420 can be a set of documents (if it is the first level) or a set of collections returned in a previous step (in any other level, such as level 2 or higher levels).

The single source summation component 1402 can generate content summaries for respective inputs of a group of received inputs (e.g., the input data 1420). Based on the content summaries, the grouping component 1404 can group first inputs of the group of received inputs as a first group and second inputs of the group of received inputs as a second group. The source categorizer component 1406 can assign a first category to the first group and a second category to the second group. Further, the multiple source summarizer component 1408 can generate a summary (e.g., output data 1422) that includes first information indicative of the first category and second information indicative of the second category.

The user interface component 1410 can output the summary (e.g., output data 1422) as an interactive and configurable hierarchical structure representation to be rendered via another system other than the system 1400. According to some implementations, the user interface component 1410 outputs the hierarchical structure representation as a tree structure. The tree structure is an organized and summarized view of the collection (e.g., the input data 1420). For example, leaves of the tree structure are indicative of inputs of the group of received inputs and a root of the tree structure is indicative of the summary. Further to this example, each node with children is parent of a set of (sub-) collections or parent of a set of documents.

In some implementations, the user interface component 1410 outputs the hierarchical structure representation as a treemap view (e.g., output data 1422). The tree map view comprises nested rectangles that represent the hierarchical structure representation. For example, a main panel includes only one rectangle that corresponds to the root node. When the user (or other entity) selects the root node (e.g., via the user interface component 1410), the main panel exhibits the root node direct children which are collections (e.g., list of categories) that belong to the upper level of the tree. In this way, the user can select a rectangle to zoom in on a specific part of the collection, seeing the sub-levels of the hierarchy.

In accordance with some implementations, the user interface component 1410 outputs the summary as a tree view (e.g., output data 1422) that displays the summary as a tree that is expandible or collapsible based on selection of elements of the tree. For example, each category is represented by a rectangle whose size is proportional to the number of child elements it has. For example, if the number of child elements is small (e.g., one child element, two child elements, five child elements), the associated rectangle is smaller as compared to a rectangle that has a larger number of child elements (e.g., twenty child elements, twenty-three child elements, and so on).

Further, a bar navigation can be placed above the main panel (or at a different location) to allow the user to return to previous states in which the tree was less extended. Each rectangle can include a title and a description that is a summary about its content.

In yet another implementation, the user interface component 1410 can output the hierarchical structure representation as a file explorer view (e.g., output data 1422). The file explorer view includes the use of multiple panels that are expanded when selected. When selected, the selected panel renders the child elements in new panels that appended to the right of the original panel (or at another location relative to the original panel). The file explorer view starts with only one panel that contains the description of the collection followed by the list of categories that are direct children of the root node. The description of the selected category appears at the top of its next panel (or at a different location).

According to some implementations, the system can include a component that, prior to generating the content summaries, divides the group of received inputs into batches. Respective sizes of the batches can be selected based on a context size of a large language model. A first temporary summary for a first batch of the batches can be generated (e.g., via the single source summation component 1402 or another system component). Generating of the first temporary summary can include sending a first prompt to the large language model. The first prompt can include a summarization instruction and a first data structure comprising first information indicative of first contents of the first batch.

Further to the above implementations, a second temporary summary for a second batch of the batches can be generated (e.g., via the single source summation component 1402 or another system component). Generating of the second temporary summary can include sending a second prompt to the large language model. The second prompt can include a combination of an update instruction, the first temporary summary, and a second data structure comprising second information indicative of second contents of the second batch. In addition, the first temporary summary can be replaced with the second temporary summary. The second temporary summary is an output of the large language model.

The system 1400 (e.g., via the user interface component 1410, via the transmitter/receiver component 1412, or via another system component can perform real-time updates that are transmitted to a client device (e.g., user equipment). The real-time updates can cause the client device to activate a user interface with the time critical updated information so the user becomes aware of the update in real-time.

According to some implementations, the user interface component 1410 (as well as other interface components discussed herein) can provide a Graphical User Interface (GUI), a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

The at least one memory 1414 can be operatively connected to the at least one processor 1416. The at least one memory 1414 can store executable instructions and/or computer executable components (e.g., the single source summation component 1402, the grouping component 1404, the source categorizer component 1406, the multiple source summarizer component 1408, the user interface component 1410, the transmitter/receiver component 1412, and so on) that, when executed by the at least one processor 1416 can facilitate performance of operations (e.g., the operations discussed with respect to the various methods and/or systems discussed herein). Further, the at least one processor 1416 can be utilized to execute computer executable components (e.g., the single source summation component 1402, the grouping component 1404, the source categorizer component 1406, the multiple source summarizer component 1408, the user interface component 1410, the transmitter/receiver component 1412, and so on) stored in the at least one memory 1414.

For example, the at least one memory 1414 can store protocols associated with facilitating large scale summarization, labelling, and categorization using large language models as discussed herein. Further, the at least one memory 1414 can facilitate action to control communication between the system 1400 and other systems, user equipment, one or more file storage systems, one or more devices, such that the system 1400 employ stored protocols and/or processes to achieve improved overall performance using large language models as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 1416 can facilitate respective analysis of information related to large scale summarization, labelling, and categorization. The at least one processor 1416 can be a processor dedicated to analyzing and/or generating information received, a processor that controls one or more components of the system 1400, and/or a processor that both analyzes and generates information received and controls one or more components of the system 1400.

The transmitter/receiver component 1412 can receive one or more commands and/or response as discussed herein. The transmitter/receiver component 1412 can be configured to transmit to, and/or receive data from, for example, a user equipment, a client, network equipment, the single source summation component 1402, the grouping component 1404, the source categorizer component 1406, the multiple source summarizer component 1408, the user interface component 1410, the transmitter/receiver component 1412, and/or other communication devices. Through the transmitter/receiver component 1412, the system 1400 can concurrently transmit and receive data, can transmit and receive data at different times, or combinations thereof.

Figure 15:
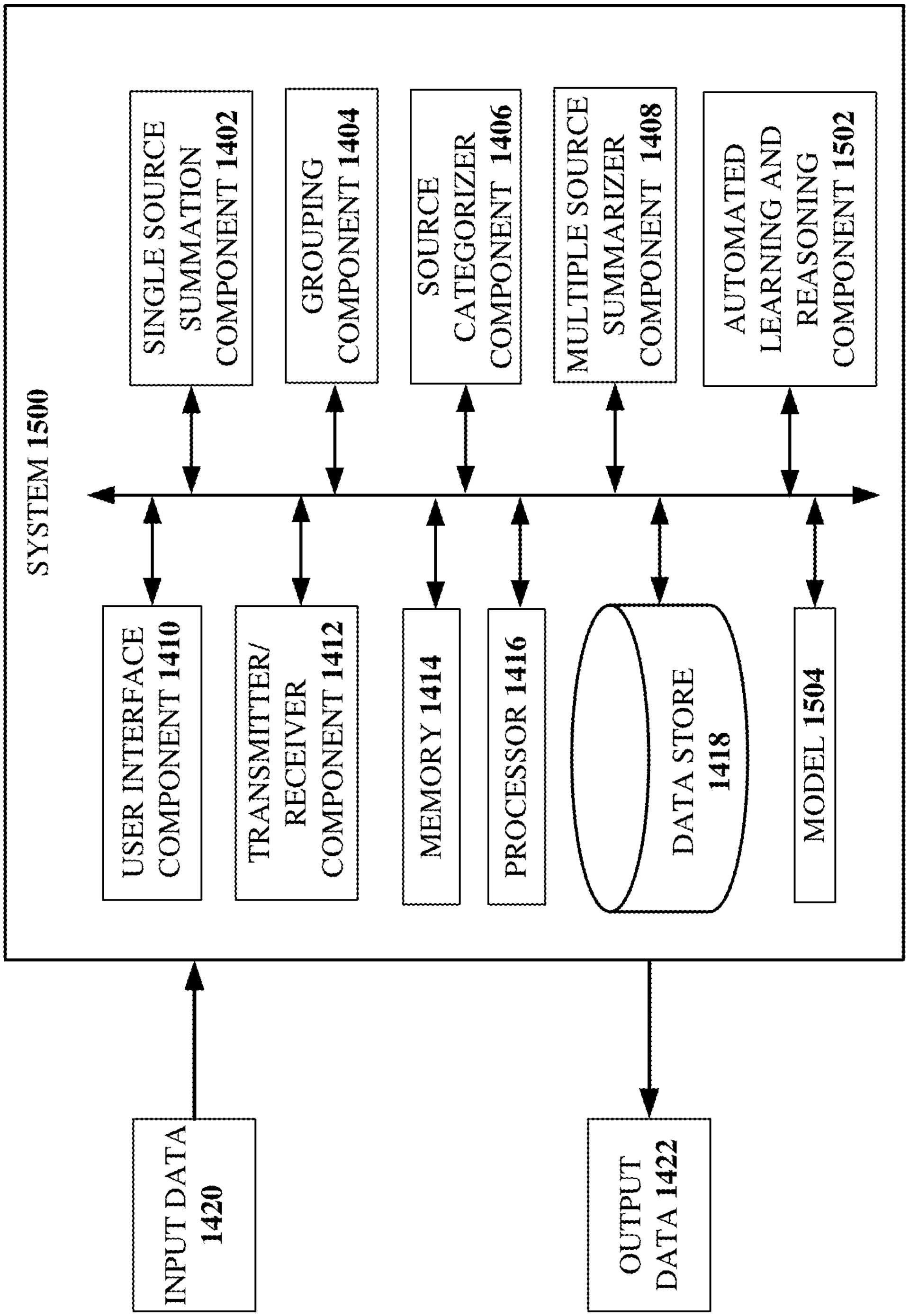
FIG. 15 illustrates an example, non-limiting, system that employs automated learning that trains a model to facilitate one or more of the disclosed aspects in accordance with one or more embodiments described herein.

FIG. 15 illustrates an example, non-limiting, system 1500 that employs automated learning that trains a model to facilitate one or more of the disclosed aspects in accordance with one or more embodiments described herein. Repetitive description of like elements employed in other embodiments described herein is omitted for sake of brevity. The system 1500 can comprise one or more of the components and/or functionality of the system 200, the operations of FIGS. 2-5, and/or the computer-implemented methods, and vice versa.

The system 1500 can utilize machine learning to train a model to facilitate large scale summarization, labelling, and categorization using large language models. The model can be trained to a defined confidence level. As illustrated, the system 1500 can comprise a machine learning and reasoning component 1502 that can be utilized to automate one or more of the disclosed aspects based on training a model 1504. The machine learning and reasoning component 1502 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1502 can employ principles of probabilistic and decision theoretic inference. Additionally, or alternatively, the machine learning and reasoning component 1502 can rely on predictive models (e.g., the model 1504) constructed using automated learning and/or automated learning procedures. Logic-centric inference can also be employed separately or in conjunction with probabilistic methods.

The machine learning and reasoning component 1502 can infer how to batch source data, how to summarize source data, how to group and categorize individual content summations, how to summarize generated collections, and/or how to render the output data via a user device, and so on.

Additionally, or alternatively, the machine learning and reasoning component 1502 can infer which operation, summation, and/or category should be suggested and/or automatically implemented based on feedback data. The feedback data can be a response received based on previously suggested, automatically implemented summarizations, categorizations, and/or renderings that are output in a perceivable format.

As used herein, the term "inference" refers generally to the process of reasoning about or inferring states of a system, a component, a module, an environment, and/or devices from a set of observations as captured through events, reports, data and/or through other forms of communication. Inference can be employed to identify when to suggest and/or dynamically implement an operation and/or policy, which operation and/or policy to suggest, an identification of a category and/or grouping, and so on, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with automatic large scale summarization, labelling, and categorization using large language models) can employ various artificial intelligence-based schemes for conducting various aspects thereof. For example, a process for determining various categories (which can be previously known categories or previously unknown categories), determining a grouping and/or categorization result based on historical data and/or feedback data, the respective values of weights to apply to one or more parameters (e.g., one or more summations, one or more categories), and so forth can be enabled through an automatic classifier system and process.

A classifier is a function that maps an input attribute vector, x=(x1, x2, x3, x4, xn), to a confidence that the input belongs to a class. In other words, f (x)=confidence (class). Such classification can employ a probabilistic and/or statistical-based analysis (e.g., factoring into the analysis utilities and costs) to provide a prognosis and/or infer one or more actions that should be employed to determine whether a categorization policy should be suggested and/or automatically implemented and/or the various steps associated with the systems of FIGS. 2 and 14, the operations of FIGS. 3-5, and/or the computer-implemented methods discussed with respect to FIGS. 16-18.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing historical data associated with previous source data categorization, feedback data associated with source data categorization policies, whether such policies are accepted or denied by receiving extrinsic information (e.g., one or more signals from various equipment), by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to batch input data into groups of data input items, how to summarize individual content, how to group the summarized individual content, how to categorize the grouping, how to summarize all groupings, how to output a result, what prompt should be provided to one or more LLMs, when to automatically implement a policy, and so forth. The criteria can include, but is not limited to, historical information, previously assigned summations, user feedback associated with output data, user feedback associated with modification of a summarized collection and/or its contents, and so forth.

According to some implementations, seed data (e.g., a data set) can be utilized as initial input to the model 1504 to facilitate the training of the model 1504. In an example, if seed data is utilized, the seed data can be obtained from one or more historical data associated with source data individual and/or collective summations, previous groupings of data, feedback associated with previously implemented data summations, and so on. However, the disclosed embodiments are not limited to this implementation and seed data is not necessary to facilitate training of the model 1504. Instead, the model 1504 can be trained on new data received (e.g., via a feedback loop). Further, in the absence of seed data, a default policy can be applied, at least initially until enough data is obtained to train a model (or more than one model) to a defined level of confidence.

If the automated learning and reasoning component 1502 has uncertainty related to the intent or request, the automated learning and reasoning component 1502 can automatically engage in a short (or long) dialogue or interaction with the user (e.g., "What do you mean?"). In accordance with some aspects, the automated learning and reasoning component 1502 engages in the dialogue with the user through another system component. Computations of the value of information can be employed to drive the asking of questions. Alternatively or additionally, a cognitive agent component (not shown) and/or the automated learning and reasoning component 1502 can anticipate a user action (e.g., "what type of summation and/or categorization is preferred?") and continually, periodically, or based on another interval, update a hypothesis as more user actions are gathered. The cognitive agent component can accumulate data or perform other actions that are a result of anticipation of the user's future actions.

The various aspects (e.g., in connection with receiving one or more selections, determining the meaning of the one or more selections, distinguishing a selection from other actions, implementation of selections to satisfy the request, and so forth) can employ various artificial intelligence-based schemes for carrying out various aspects thereof. For example, a process for determining if a particular action is a request for an action to be performed or a general action (e.g., an action that the user desires to perform manually) can be enabled through an automatic classifier system and process.

Figure 16:
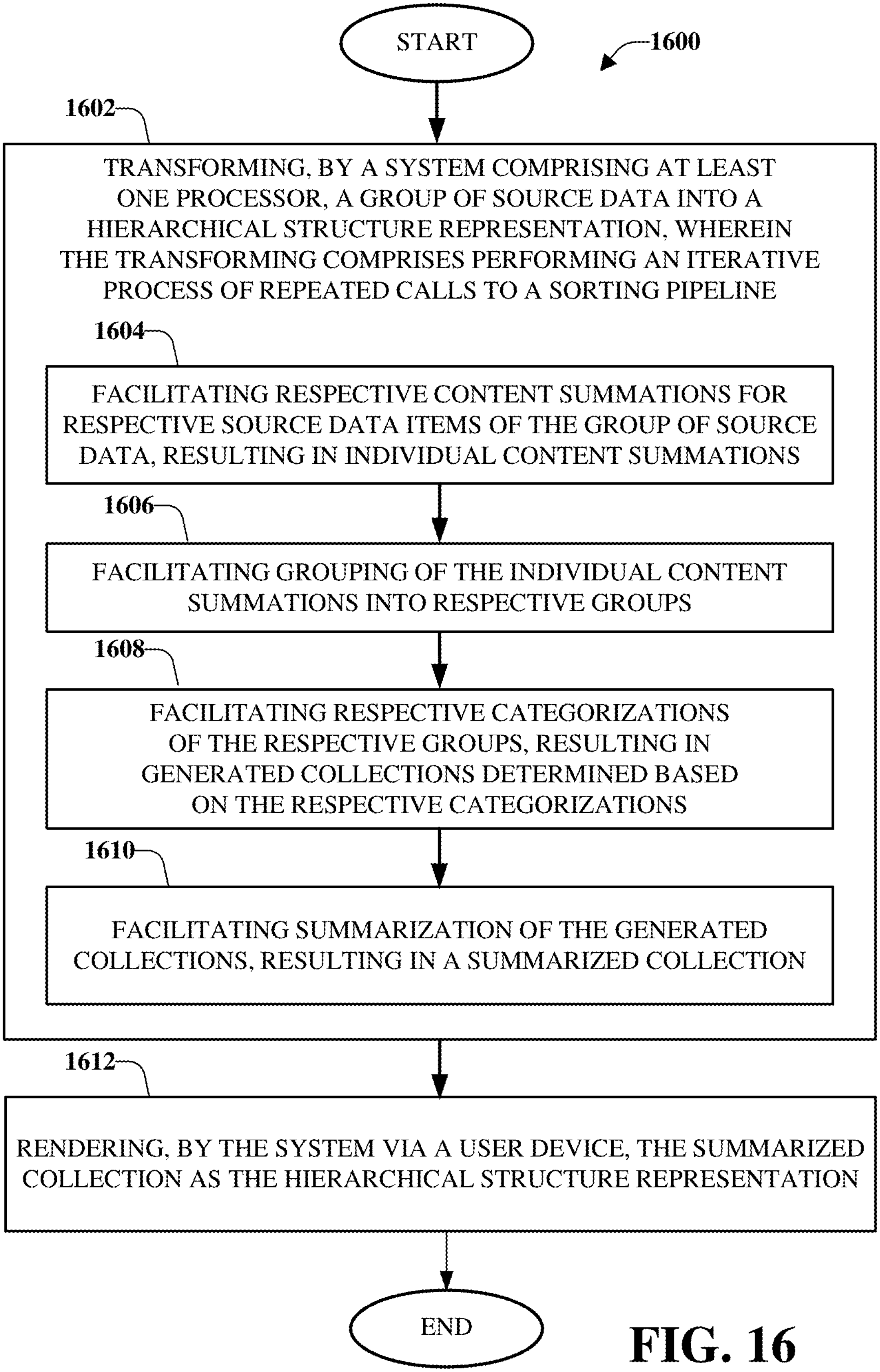
FIG. 16 illustrates an example, non-limiting, computer-implemented method that facilitates large scale summarization, labelling, and categorization in accordance with one or more embodiments described herein.

FIG. 16 illustrates an example, non-limiting, computer-implemented method 1600 that facilitates large scale summarization, labelling, and categorization in accordance with one or more embodiments described herein. The computer-implemented method 1600 and/or other methods discussed herein can be implemented by network equipment comprising a processor. According to another example, the computer-implemented method can be implemented by a system (e.g., the system 1400, the system 1500, and so on) comprising at least one processor and a memory.

The computer-implemented method 1600 can be repeated for each level and/or while the collection is above a defined threshold size. The computer-implemented method 1600 starts, at 1602, with transforming, by a system comprising at least one processor, a group of source data into a hierarchical structure representation. The transforming includes performing an iterative process of repeated calls to a sorting pipeline.

Further, performing of the iterative process includes, at 1604, facilitating respective content summations for respective source data items of the group of source data, resulting in individual content summations. At 1606, the computer-implemented method 1600 includes facilitating grouping of the individual content summations into respective groups. Further the computer-implemented method 1600 includes, at 1608, facilitating respective categorizations of the respective groups, resulting in generated collections determined based on the respective categorizations. At 1610, the computer-implemented method 1600 includes facilitating summarization of the generated collections, resulting in a summarized collection. In an example, facilitating of the summarization of the generated collections can include determining a textual summary of all elements contained in the generated collections.

At 1612, the computer-implemented method 1600 includes, rendering, by the system via a user device, the summarized collection as the hierarchical structure representation. According to some implementations, the hierarchical structure representation is a tree structure. Further to these implementations, the group of source data is represented as leaves of the tree structure and a root of the tree structure represents a collection of the generated collections.

According to some implementations, the rendering at 1612 can include outputting the summarized collection as a treemap view that comprises nested rectangles that represent the hierarchical structure representation. In some implementations, the rendering at 1612 can include outputting the summarized collection as a tree view that displays the generated collections as a tree that is expandible or collapsible based on selection of elements of the tree. In yet another implementation, the rendering at 1612 can include outputting the summarized collection as a file explorer view.

In accordance with some implementations, the iterative process is a first iterative process, the summarized collection is intermediate output data, and the computer-implemented method 1600 includes prior to the rendering, performing a second iterative process of repeated calls to the sorting pipeline for the summarized collection as the intermediate output data, resulting in an updated summarized collection. Further, the computer-implemented method 1600 can include rendering, by the system via the user device, the updated summarized collection as the hierarchical structure representation.

The computer-implemented method 1600 can include, according to some implementations, prior to the facilitating of the summarization of the generated collections, determining, by the system, respective quantities of children nodes associated with the generated collections. Based on a collection of the generated collections being determined to comprise a quantity of children nodes that is greater than a defined threshold, the computer-implemented method 1600 can include dividing the collection into subcollections. Further to these implementations, the dividing can include using a title of the collection as an input context.

In accordance with some implementations, the computer-implemented method 1600 can include using, by the system, a large language model for the facilitating of the respective content summations. The computer-implemented method 1600 can also include sending, by the system, a prompt to the large language model, wherein the prompt comprises formatted joining instructions and information indicative of content to be summarized.

Figure 17:
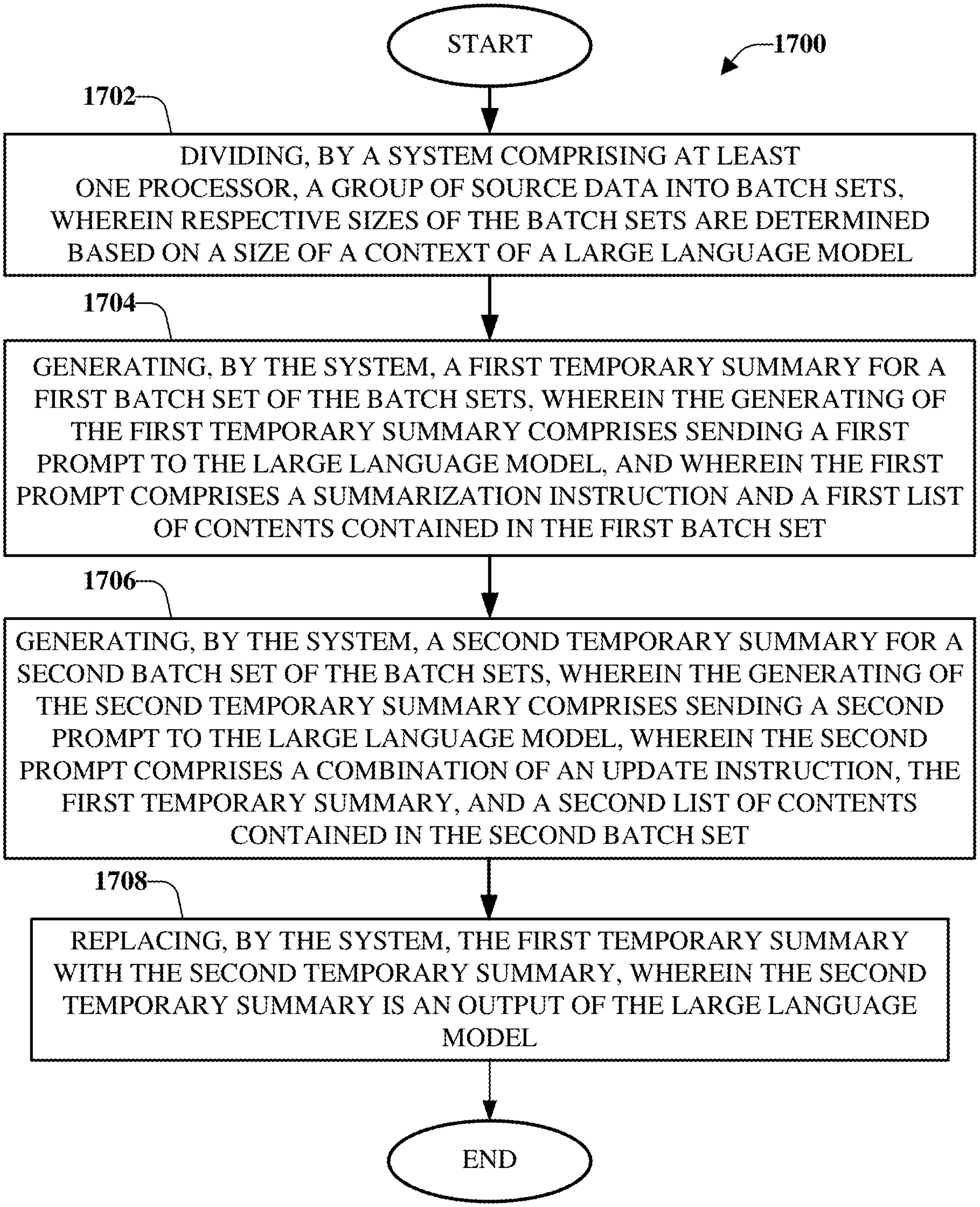
FIG. 17 illustrates an example, non-limiting, computer-implemented method that facilitates large scale summarization, labelling, and categorization using large language models in accordance with one or more embodiments described herein.

FIG. 17 illustrates an example, non-limiting, computer-implemented method 1700 that facilitates large scale summarization, labelling, and categorization using large language models in accordance with one or more embodiments described herein. The computer-implemented method 1700 and/or other methods discussed herein can be implemented by network equipment comprising a processor. According to another example, the computer-implemented method can be implemented by a system comprising at least one processor and a memory.

The computer-implemented method 1700 starts, at 1702, when a group of source data is divided into batch sets. Respective sizes of the batch sets are determined based on a size of a context of a large language model.

At 1704, a first temporary summary for a first batch set of the batch sets is generated. Generating of the first temporary summary can include sending a first prompt to the large language model. For example, the first prompt can include a summarization instruction and a first list of contents contained in the first batch set.

Further, at 1706, a second temporary summary for a second batch set of the batch sets is generated. Generating of the second temporary summary can include sending a second prompt to the large language model. For example, the second prompt can include a combination of an update instruction, the first temporary summary, and a second list of contents contained in the second batch set.

The first temporary summary is replaced, at 1708, with the second temporary summary, at 1708. The second temporary summary is an output of the large language model.

Figure 18:
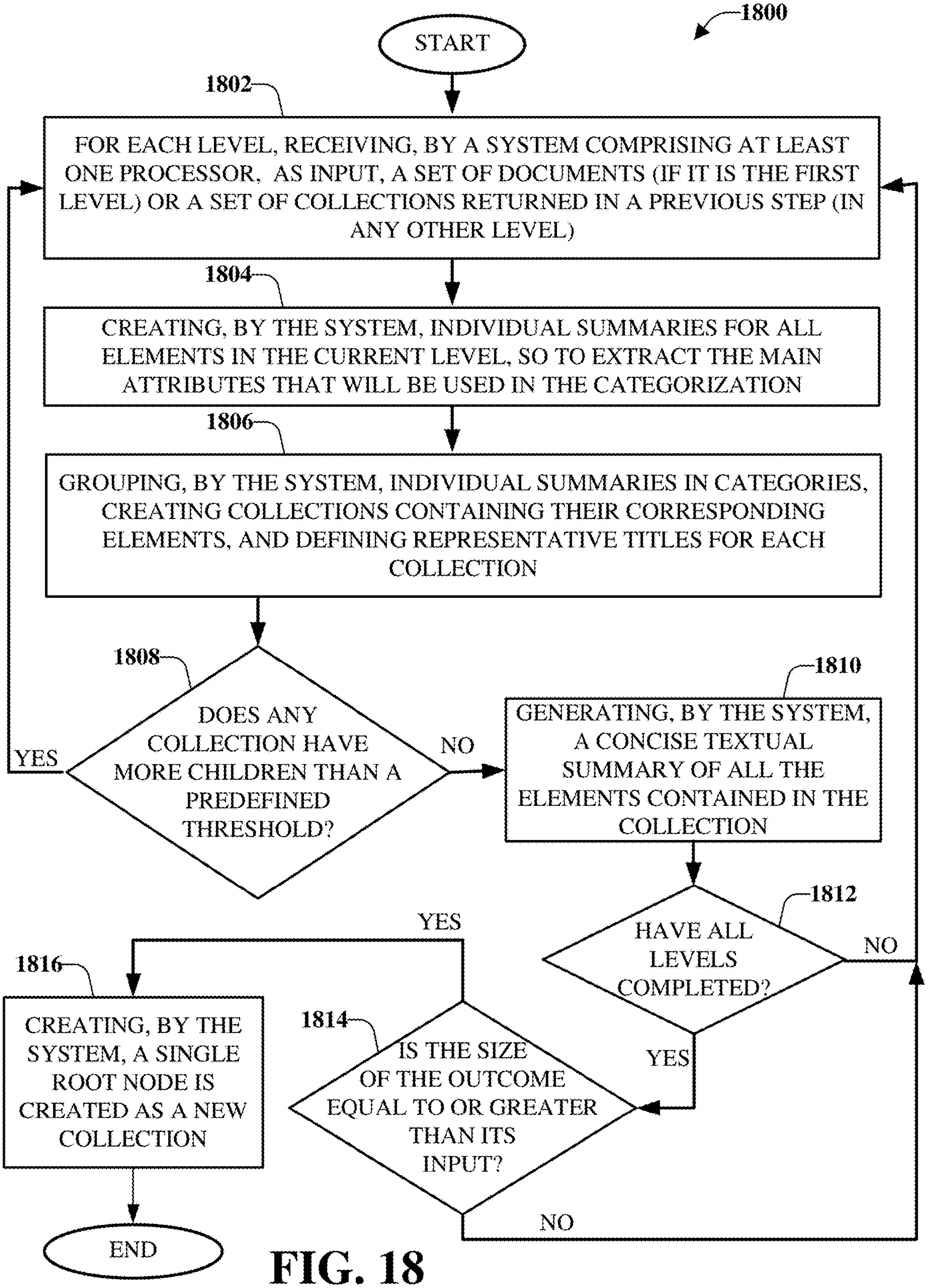
FIG. 18 illustrates an example, non-limiting, computer-implemented method that facilitates large scale summarization, labelling, and categorization by setting elements recursively in accordance with one or more embodiments described herein.

FIG. 18 illustrates an example, non-limiting, computer-implemented method 1800 that facilitates large scale summarization, labelling, and categorization by setting elements recursively in accordance with one or more embodiments described herein. The computer-implemented method 1800 and/or other methods discussed herein can be implemented by network equipment comprising a processor. According to another example, the computer-implemented method can be implemented by a system comprising at least one processor and a memory.

The computer-implemented method 1800 executes multiple times according to a predefined number which corresponds to a tree height. The output of each iteration is a new level of a collection tree containing the elements of the previous level grouped by categories. The algorithm ends when the stop criteria is reached.

The computer-implemented method 1800 starts, at 1802, for each level, receiving as input a set of documents (if it is the first level) or a set of collections returned in a previous step (in any other level). As noted previously, input data, other than documents can be utilized with the disclosed embodiments. However, documents are utilized for purposes of discussing the disclosed embodiments.

At 1804, the computer-implemented method 1800 creates individual summaries for all elements in the current level so to extract the main attributes that will be used in the categorization (e.g., via a single source summarizer, via the single source summation component 1402). At 1806, the computer-implemented method 1800 groups individual summaries in categories, creates collections containing their corresponding elements, and defines representative titles for each collection (e.g., via a source categorizer, via the grouping component 1404).

At 1808, a determination is made whether any collection generated at 1806 has more children than a predefined threshold. If there are more children than the predefined threshold ("YES"), the computer-implemented method 1800 returns to 1802 and recursively breaks down the collection in subcollections. In this case, the inputs are only the elements of the collection being divided and using the collection's title as extra context for the grouping and categorization step.

If the determination at 1808 is that there are no collections generated at 1806 that have more children than a predefined threshold ("NO"), at 1810, for each collection created, the computer-implemented method 1800 generates a concise textual summary of all the elements contained in the collection (e.g., via a multiple source summarizer, via the multiple source summarizer component 1408).

At 1812, a determination is made whether all levels have completed. If not ("NO"), the computer-implemented method 1800 returns to 1802 for the next (e.g., subsequent) level. If the determination at 1812 is that it is the last level ("YES"), another determination is made, at 1814, whether the size of the outcome is equal to or greater than its input. If not ("NO"), the computer-implemented method returns to 1802.

Alternatively, if the determination at 1814 is that the outcome is equal to or greater than its input ("YES"), the computer-implemented method 1800 continues, at 1816, and a single root node is created as a new collection. The single root node can contain, as children, all collections generated in the last execution at 1810, containing a general summary (using collection summarization) for the entire database.

The result is a tree, where the root is a collection and each node with children is parent of a set of (sub-) collections or parent of a set of documents. Documents are leaves of the tree.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term "storage device," "first storage device," "second storage device," "storage cluster nodes," "storage system," "data store" and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 19:
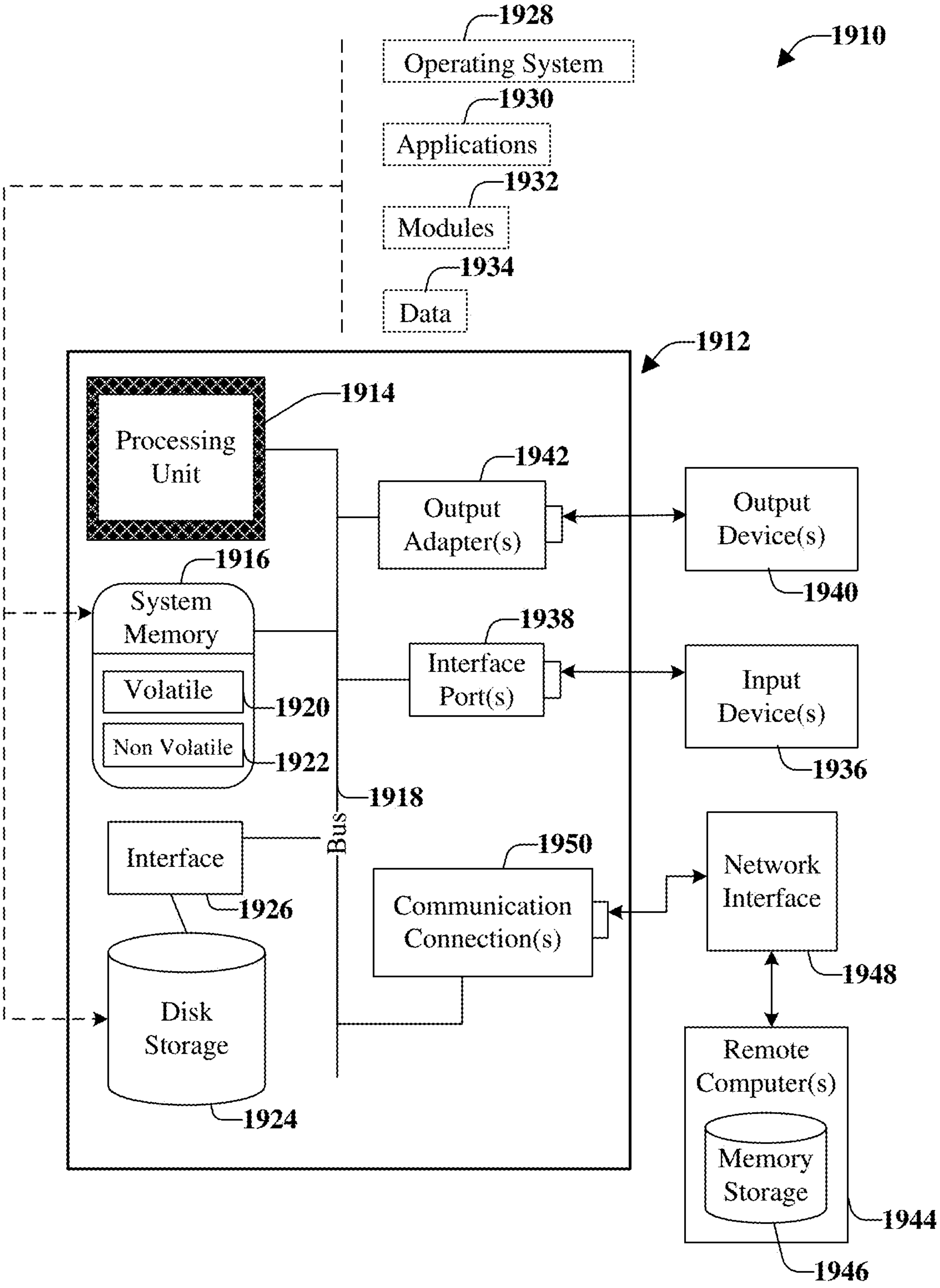
FIG. 19 illustrates an example, non-limiting, computing environment in which one or more embodiments described herein can be facilitated.

In order to provide a context for the various aspects of the disclosed subject matter, FIG. 19 as well as the following discussion are intended to provide a brief, general description of a suitable environment in which the various aspects of the disclosed subject matter can be implemented.

With reference to FIG. 19, an example environment 1910 for implementing various aspects of the aforementioned subject matter comprises a computer 1912. The computer 1912 comprises a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 comprises volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can comprise read only memory (ROM), programmable ROM (PROM), electrically programmable ROM (EPROM), electrically erasable PROM (EEPROM), or flash memory. Volatile memory 1920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also comprises removable/non-removable, volatile/non-volatile computer storage media. FIG. 19 illustrates, for example, a disk storage 1924. Disk storage 1924 comprises, but is not limited to, devices like a magnetic disk drive, floppy disk drive, tape drive, Jaz drive, Zip drive, LS-100 drive, flash memory card, or memory stick. In addition, disk storage 1924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

According to some implementations, the example environment 1910 can include non-transitory machine-readable medium, comprising executable instructions that, when executed by at least one processor of network equipment, facilitate performance of operations. The operations can include transforming files into a hierarchical structure representation, the transforming comprises performing an iterative process of repeated calls to a sorting pipeline. The iterative process can include summarizing respective content for the files, resulting in individual content summations, grouping the individual content summations into respective groups, categorizing the respective groups, resulting in generated collections, and summarizing the generated collections, resulting in a summarized collection. The operations can also include outputting the summarized collection as the hierarchical structure representation at a user device. The output at the user device can be in real-time such that changes that occur can be brought to the attention of the user of the user device in real-time.

In some implementations, the operations can include prior to the summarizing of the generated collections, determining respective quantities of children nodes associated with the generated collections. Further, the operations can include determining that a collection of the generated collections comprises a quantity of children nodes greater than a defined threshold. Additionally, the operations can include, in response to determining that the collection comprises the quantity of children nodes greater than the defined threshold, dividing the collection into subcollections.

In yet another implementation, the operations can include employing a large language model for the summarizing of the respective content for the files. The operations can also include sending a prompt to the large language model, wherein the prompt comprises formatted joining instructions and information indicative of the respective content to be summarized.

The operations can include, according to some implementations, prior to the summarizing of the respective content, splitting the files into batch sets, wherein respective sizes of the batch sets are determined based on a size of a context of a large language model. The operations can also include generating a first temporary summary for a first batch set of the batch sets. Generating of the first temporary summary can include sending a first prompt to the large language model. The first prompt can include a summarization instruction and a first list of contents contained in the first batch set. Further, the operations can include generating a second temporary summary for a second batch set of the batch sets. Generating of the second temporary summary can include sending a second prompt to the large language model. The second prompt can include a combination of an update instruction, the first temporary summary, and a second list of contents contained in the second batch set. The operations can also include replacing the first temporary summary with the second temporary summary, wherein the second temporary summary is an output of the large language model.

It is to be appreciated that FIG. 19 describes software that acts as an intermediary between users and the basic computer resources described in suitable operating environment 1910. Such software comprises an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 comprise, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 comprise, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically comprises many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 comprises, for exemplary purposes only, internal, and external technologies such as, modems including regular telephone grade modems, cable modems and DSL modems, ISDN adapters, and Ethernet cards.

Figure 20:
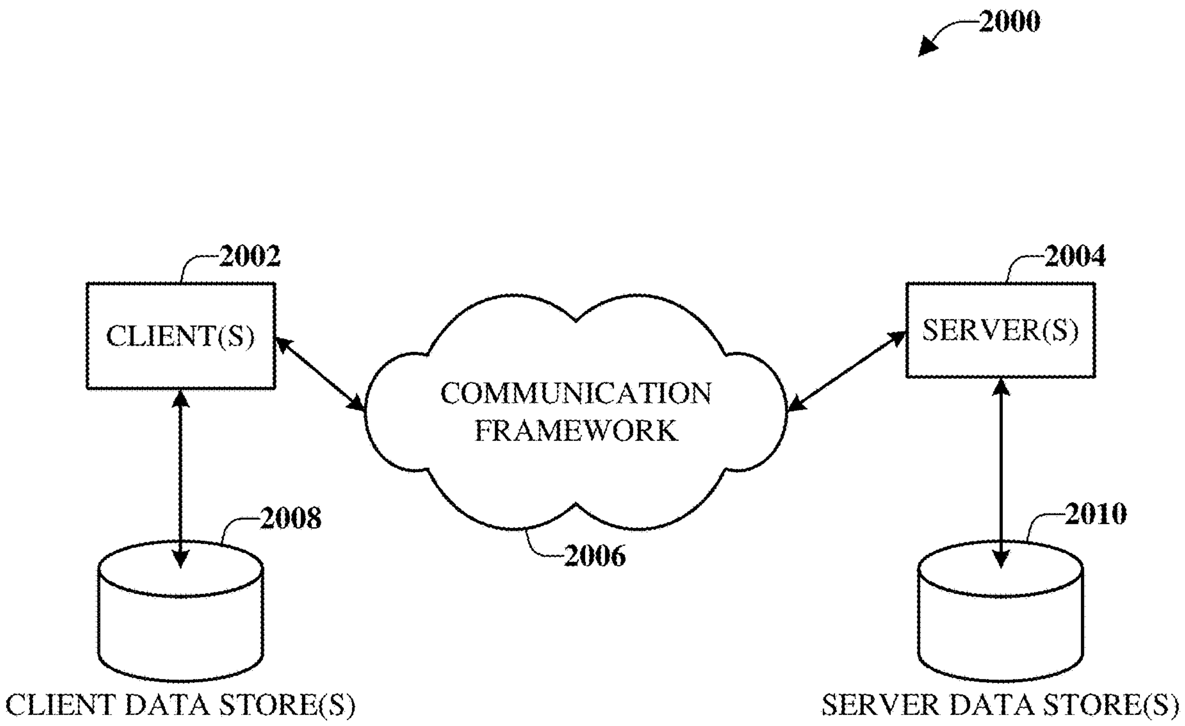
FIG. 20 illustrates an example, non-limiting, networking environment in which one or more embodiments described herein can be facilitated.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, random access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

transforming, by a system comprising at least one processor, a group of source data into a hierarchical structure representation, wherein the transforming comprises performing an iterative process of repeated calls to a sorting pipeline, and wherein the performing of the iterative process comprises:

dividing the group of source data into batch sets, wherein respective sizes of the batch sets are determined based on a size of a context of a large language model;

generating a first temporary summary for a first batch set of the batch sets, wherein the generating of the first temporary summary comprises sending a first prompt to the large language model, and wherein the first prompt comprises a summarization instruction and a first list of contents contained in the first batch set;

generating a second temporary summary for a second batch set of the batch sets, wherein the generating of the second temporary summary comprises sending a second prompt to the large language model, wherein the second prompt comprises a combination of an update instruction, the first temporary summary, and a second list of contents contained in the second batch set;

replacing the first temporary summary with the second temporary summary, wherein the second temporary summary is an output of the large language model;

facilitating respective content summations for respective source data items of the group of source data, resulting in individual content summations, facilitating, via parallel processing, a grouping of the individual content summations into respective groups, facilitating respective categorizations of the respective groups using existing categories, and based on a group of the respective groups being an uncategorized group that does not match the existing categories, using key-value mapping that creates a category for the uncategorized group, resulting in generated collections determined based on the respective categorizations, facilitating summarization of the generated collections, resulting in a summarized collection; and rendering, by the system via a user device, the summarized collection as the hierarchical structure representation.

2. The method of claim 1, wherein the iterative process is a first iterative process, wherein the summarized collection is intermediate output data, and wherein the method further comprises:

prior to the rendering, performing a second iterative process of repeated calls to the sorting pipeline for the summarized collection as the intermediate output data, resulting in an updated summarized collection; and rendering, by the system via the user device, the updated summarized collection as the hierarchical structure representation.

3. The method of claim 1, further comprising:

prior to the facilitating of the summarization of the generated collections, determining, by the system, respective quantities of children nodes associated with the generated collections; and based on a collection of the generated collections being determined to comprise a quantity of children nodes that is greater than a defined threshold, dividing the collection into subcollections.

4. The method of claim 3, wherein the dividing comprises using a title of the collection as an input context.

5. The method of claim 1, wherein the facilitating of the summarization of the generated collections comprises determining a textual summary of all elements contained in the generated collections.

6. The method of claim 1, further comprising:

using, by the system, the large language model for the facilitating of the respective content summations; and sending, by the system, a prompt to the large language model, wherein the prompt comprises formatted joining instructions and information indicative of content to be summarized.

7. The method of claim 1, wherein the hierarchical structure representation is a tree structure, and wherein the group of source data is represented as leaves of the tree structure and a root of the tree structure represents a collection of the generated collections.

8. The method of claim 1, wherein the rendering comprises outputting the summarized collection as a treemap view that comprises nested rectangles that represent the hierarchical structure representation.

9. The method of claim 1, wherein the rendering comprises outputting the summarized collection as a tree view that displays the generated collections as a tree that is expandible or collapsible based on selection of elements of the tree.

10. The method of claim 1, wherein the rendering comprises rendering an interactive navigation of the hierarchical structure representation based on different visualization processes that allow navigation of the summarized collection in accordance with respective interactive and progressive capabilities.

11. A system, comprising:

at least one processor; and at least one memory that stores executable instructions that, when executed by the at least one processor, facilitate performance of operations, comprising:

dividing a group of received inputs into batches, wherein respective sizes of the batches are selected based on a context size of a large language model;

generating a first temporary summary for a first batch of the batches, wherein the generating of the first temporary summary comprises sending a first prompt to the large language model, and wherein the first prompt comprises a summarization instruction and a first data structure comprising first information indicative of first contents of the first batch;

generating a second temporary summary for a second batch of the batches, wherein the generating of the second temporary summary comprises sending a second prompt to the large language model, and wherein the second prompt comprises a combination of an update instruction, the first temporary summary, and a second data structure comprising second information indicative of second contents of the second batch;

replacing the first temporary summary with the second temporary summary, wherein the second temporary summary is an output of the large language model;

generating content summaries for respective inputs of the group of received inputs;

based on the content summaries, grouping, via parallel processing, first inputs of the group of received inputs as a first group and second inputs of the group of received inputs as a second group;

assigning a first category to the first group and a second category to the second group, wherein the assigning comprises, using key-value mapping to create the first category and the second category;

generating a summary that comprises first information indicative of the first category and second information indicative of the second category; and outputting the summary as an interactive and configurable hierarchical structure representation to be rendered via another system other than the system.

12. The system of claim 11, wherein the generating of the content summaries is facilitated using the large language model, and wherein the operations comprise:

sending a prompt to the large language model, wherein the prompt comprises formatted joining instructions and information indicative of respective content of the respective inputs.

13. The system of claim 11, wherein the outputting comprises outputting the hierarchical structure representation as a tree structure, wherein leaves of the tree structure are indicative of inputs of the group of received inputs, and wherein a root of the tree structure is indicative of the summary.

14. The system of claim 11, wherein the outputting comprises outputting the hierarchical structure representation as a treemap view that comprises nested rectangles that represent the hierarchical structure representation.

15. The system of claim 11, wherein the outputting comprises outputting the summary as a tree view that displays the summary as a tree that is expandible or collapsible based on selection of elements of the tree.

16. A non-transitory machine-readable medium, comprising executable instructions that, when executed by at least one processor of network equipment, facilitate performance of operations, the operations comprising:

transforming files into a hierarchical structure representation, the transforming comprises performing an iterative process of repeated calls to a sorting pipeline, and the iterative process comprising:

prior to the summarizing of the respective content, splitting the files into batch sets, wherein respective sizes of the batch sets are determined based on a size of a context of a large language model;

generating a first temporary summary for a first batch set of the batch sets, wherein the generating of the first temporary summary comprises sending a first prompt to the large language model, and wherein the first prompt comprises a summarization instruction and a first list of contents contained in the first batch set;

generating a second temporary summary for a second batch set of the batch sets, wherein the generating of the second temporary summary comprises sending a second prompt to the large language model, and wherein the second prompt comprises a combination of an update instruction, the first temporary summary, and a second list of contents contained in the second batch set; and replacing the first temporary summary with the second temporary summary, wherein the second temporary summary is an output of the large language model;

summarizing respective content for the files, resulting in individual content summations, grouping, via parallel processing, the individual content summations into respective groups, categorizing the respective groups using existing categories and, based on a group of the respective groups being an uncategorized group that does not matching the existing categories, using key-value mapping that creates a category for the uncategorized group, resulting in generated collections, summarizing the generated collections, resulting in a summarized collection; and outputting the summarized collection as the hierarchical structure representation at a user device, wherein the outputting facilitates an interactive navigation of the hierarchical structure representation based on different visualization strategies that allow navigation of the summarized collection in an interactive and progressive manner.

17. The non-transitory machine-readable medium of claim 16, wherein the operations further comprise:

prior to the summarizing of the generated collections, determining respective quantities of children nodes associated with the generated collections;

determining that a collection of the generated collections comprises a quantity of children nodes greater than a defined threshold; and in response to determining that the collection comprises the quantity of children nodes greater than the defined threshold, dividing the collection into subcollections.

18. The non-transitory machine-readable medium of claim 16, wherein the operations further comprise:

employing the large language model for the summarizing of the respective content for the files; and sending a prompt to the large language model, wherein the prompt comprises formatted joining instructions and information indicative of the respective content to be summarized.

19. The non-transitory machine-readable medium of claim 16, wherein the hierarchical structure representation is a tree structure, and wherein the files are represented as leaves of the tree structure and a root of the tree structure represents a collection of the generated collections.

20. The non-transitory machine-readable medium of claim 16, wherein the rendering comprises:

outputting the summarized collection as a treemap view that comprises nested rectangles that represent the hierarchical structure representation, or outputting the summarized collection as a tree view that displays the generated collections as a tree that is expandible or collapsible based on selection of elements of the tree.

* * * * *